US011733964B2

(12) United States Patent
Yoon et al.

(10) Patent No.: US 11,733,964 B2
(45) Date of Patent: Aug. 22, 2023

(54) METHOD FOR OPERATING SPEECH RECOGNITION SERVICE AND ELECTRONIC DEVICE SUPPORTING THE SAME

(71) Applicant: Samsung Electronics Co., Ltd., Suwon-si (KR)

(72) Inventors: Young Min Yoon, Seoul (KR); Young II Oh, Gwacheon-si (KR); Hyun Woo Kang, Suwon-si (KR); Jin Yeol Kim, Seoul (KR); Ji Hyun Kim, Yongin-si (KR); Da Som Lee, Seoul (KR); Yong Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/937,145

(22) Filed: Mar. 27, 2018

(65) Prior Publication Data
US 2018/0285070 A1  Oct. 4, 2018

(30) Foreign Application Priority Data

Mar. 28, 2017  (KR) .................. 10-2017-0039593

(51) Int. Cl.
*G06F 17/00* (2019.01)
*G06F 3/16* (2006.01)
(Continued)

(52) U.S. Cl.
CPC ............ *G06F 3/167* (2013.01); *G06F 3/0481* (2013.01); *G06F 3/0484* (2013.01); *G10L 15/22* (2013.01);
(Continued)

(58) Field of Classification Search
CPC ........ G06F 3/16; G06F 3/0481; G06F 3/0484; G06F 3/167; G06F 3/048; G10L 2015/223; G10L 2015/22; G10L 15/04; G10L 15/30
(Continued)

(56) References Cited

U.S. PATENT DOCUMENTS 6,185,535 B1   2/2001  Hedin et al.
7,822,610 B2  10/2010  Burns et al.
(Continued)

FOREIGN PATENT DOCUMENTS

CN       1329739 A    1/2002
CN     101366075 A    2/2009
(Continued)

OTHER PUBLICATIONS

Extended European Search Report dated Feb. 17, 2020, issued in European Application No. 18776430.3.
(Continued)

*Primary Examiner* — Stephen S Hong
*Assistant Examiner* — Matthew J Ludwig
(74) *Attorney, Agent, or Firm* — Jefferson IP Law, LLP

(57) ABSTRACT

An electronic device is provided. The electronic device includes a processor, and a memory, wherein the memory stores instructions that, when executed, cause the processor to receive a user input including a request for performing a first task that requires at least one parameter for execution and not including the entire at least one parameter, transmit first data related to the user input to an external server, receive a first sequence of states of the electronic device for performing the first task from the external server, perform not all but some of the first sequence of the states while displaying at least some of states changed in the first sequence, and after the performing of the some of the first
(Continued)

sequence, display a GUI that is required for performing the first task and represents that a user is requested to provide at least one parameter omitted in the user input.

10 Claims, 17 Drawing Sheets

(51) Int. Cl.
*G10L 15/22* (2006.01)
*G06F 3/0481* (2022.01)
*G06F 3/0484* (2022.01)

(52) U.S. Cl.
CPC .. *G10L 2015/223* (2013.01); *G10L 2015/228* (2013.01)

(58) Field of Classification Search
USPC ......................................... 715/202, 204, 728
See application file for complete search history.

(56) References Cited

U.S. PATENT DOCUMENTS

| | | | |
|---|---|---|---|
| 7,957,975 B2 | 6/2011 | Burns et al. | |
| 8,315,878 B1 | 11/2012 | Burns et al. | |
| 8,682,676 B2 | 3/2014 | Burns et al. | |
| 8,682,906 B1* | 3/2014 | Carasso | G06F 40/166 707/749 |
| 8,775,189 B2 | 7/2014 | Burns et al. | |
| 8,812,325 B2 | 8/2014 | Burns et al. | |
| 9,293,139 B2 | 3/2016 | Burns et al. | |
| 9,747,896 B2* | 8/2017 | Kennewick, Jr. | G06F 17/28 |
| 9,898,509 B2* | 2/2018 | Saperstein | G06F 16/2456 |
| 9,922,642 B2 | 3/2018 | Pitschel et al. | |
| 9,966,065 B2* | 5/2018 | Gruber | G10L 15/28 |
| 10,176,171 B1* | 1/2019 | Patterson | G06F 9/454 |
| 10,217,462 B2* | 2/2019 | Sarikaya | G10L 15/183 |
| 10,249,300 B2* | 4/2019 | Booker | G10L 15/22 |
| 10,303,715 B2* | 5/2019 | Graham | G06F 16/3329 |
| 10,372,311 B2 | 8/2019 | Yamada et al. | |
| 10,394,946 B2* | 8/2019 | Miller | G06F 16/2477 |
| 10,699,717 B2* | 6/2020 | Orr | G05B 15/02 |
| 10,733,993 B2* | 8/2020 | Kudurshian | G10L 15/30 |
| 10,741,181 B2* | 8/2020 | Garg | G10L 15/1815 |
| 10,741,185 B2* | 8/2020 | Gruber | G06F 3/167 |
| 10,839,803 B2* | 11/2020 | Hughes | G10L 15/22 |
| 10,909,331 B2* | 2/2021 | Peitz | G10L 15/16 |
| 10,942,703 B2* | 3/2021 | Martel | G06F 3/167 |
| 11,048,473 B2* | 6/2021 | Carson | G06F 16/3344 |
| 2002/0080163 A1* | 6/2002 | Morey | H04N 21/42204 348/E7.071 |
| 2003/0001881 A1* | 1/2003 | Mannheimer | G11B 19/025 715/728 |
| 2003/0033153 A1* | 2/2003 | Olson | G06F 3/16 704/275 |
| 2003/0046401 A1* | 3/2003 | Abbott | G06F 9/451 709/227 |
| 2006/0064431 A1* | 3/2006 | Kishore | G06Q 30/02 707/999.102 |
| 2007/0099602 A1* | 5/2007 | Kurlander | H04M 1/72454 455/418 |
| 2007/0156411 A1 | 7/2007 | Burns et al. | |
| 2007/0156412 A1 | 7/2007 | Burns et al. | |
| 2007/0174058 A1 | 7/2007 | Burns et al. | |
| 2007/0288439 A1* | 12/2007 | Rappaport | G06F 16/9535 |
| 2009/0006343 A1 | 1/2009 | Platt et al. | |
| 2009/0164431 A1* | 6/2009 | Zivkovic | G06F 16/9535 |
| 2009/0254539 A1* | 10/2009 | Wen | G06F 16/583 707/999.005 |
| 2009/0287628 A1* | 11/2009 | Indeck | G06F 16/24544 706/47 |
| 2010/0145700 A1* | 6/2010 | Kennewick | G06F 16/3329 704/E15.001 |
| 2010/0145707 A1* | 6/2010 | Ljolje | G10L 15/187 704/267 |
| 2010/0161337 A1* | 6/2010 | Pulz | G10L 15/19 704/E15.001 |
| 2011/0010170 A1 | 1/2011 | Burns et al. | |
| 2011/0172873 A1* | 7/2011 | Szwabowski | G06Q 50/30 701/29.5 |
| 2012/0239653 A1 | 9/2012 | Platt et al. | |
| 2012/0245944 A1* | 9/2012 | Gruber | G06F 9/54 704/270.1 |
| 2012/0313854 A1* | 12/2012 | Senanayake | G06F 3/041 345/161 |
| 2013/0073294 A1 | 3/2013 | Burns et al. | |
| 2014/0095173 A1* | 4/2014 | Lynch | G06F 3/167 704/275 |
| 2014/0136013 A1* | 5/2014 | Wolverton | B60W 50/10 701/1 |
| 2014/0163995 A1 | 6/2014 | Burns et al. | |
| 2014/0278413 A1* | 9/2014 | Pitschel | G10L 15/22 704/243 |
| 2016/0041732 A1 | 2/2016 | Yamada et al. | |
| 2016/0140960 A1* | 5/2016 | Chae | G10L 15/22 704/275 |
| 2016/0210602 A1* | 7/2016 | Siddique | G06Q 20/384 |
| 2017/0206797 A1* | 7/2017 | Solomon | G06N 3/006 |
| 2018/0019000 A1* | 1/2018 | Delpuch | H04N 21/482 |

FOREIGN PATENT DOCUMENTS

| | | |
|---|---|---|
| CN | 105027197 A | 11/2015 |
| KR | 10-2009-0115599 A | 11/2009 |
| KR | 10-2013-0068303 A | 6/2013 |
| WO | 2014/162703 A1 | 10/2014 |

OTHER PUBLICATIONS

Chinese Office Action dated May 9, 2023, issued in Chinese Patent Application No. 201880021912.3.

* cited by examiner

METHOD FOR OPERATING SPEECH RECOGNITION SERVICE AND ELECTRONIC DEVICE SUPPORTING THE SAME

CROSS-REFERENCE TO RELATED APPLICATION(S)

This application is based on and claims priority under 35 U.S.C. § 119 of a Korean patent application number 10-2017-0039593, filed on Mar. 28, 2017, in the Korean Intellectual Property Office, the disclosure of which is incorporated by reference herein its entirety.

TECHNICAL FIELD

The disclosure relates to a speech input processing technology.

BACKGROUND

Recent electronic devices have suggested input schemes of various aspects as a part for aiming at interactions with users. For example, the electronic devices may operate speech input schemes, through which speech data according to the utterances of the users are input, based on the executions of applications. Moreover, the electronic devices may derive intentions of utterances of the users by recognizing the input speech data and may perform operations corresponding to the derived intentions of the utterances. This may be realized based on systems. The artificial intelligent systems are computer systems that realize the intelligences of the human level, and the machines make decisions while being trained by themselves and the recognition rates of the machines improve as they are used over time. The artificial intelligence technologies include element technologies (e.g., inference/prediction technologies of logically making inference and prediction by determining linguistic understanding technologies and information for recognizing languages/letters of human beings) that simulate functions of brains of the human beings, such as recognition and determination by utilizing machine learning (deep learning) technologies that use algorithms that classifying/learning the features of input data by themselves and the machine learning algorithms.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for operating a speech recognition service, by which a speech input according to an utterance of the user may be reliably processed by providing a graphical user interface (GUI) for the utterance of the user when the utterance of the user is insufficient to induce an additional input of the user, and an electronic device supporting the same.

The performances of the operations of the electronic devices corresponding to utterances of the users may be based on a series of sequences created based on information included in the utterances of the users. Accordingly, when the utterances of the users are insufficient or ambiguous, it is impossible to obtain explicit information so that the sequences may be generated in incomplete states. Therefore, the electronic devices cannot complete the performances of the operations corresponding to the intentions of the utterances of the users so that the speech inputs of the users may not be processed or the reliabilities of the processing may deteriorate.

In accordance with an aspect of the disclosure an electronic device is provided. The electronic device includes a housing, a display exposed through at least a portion of the housing, a microphone, a speaker, a communication circuit, a processor electrically connected to the display, the microphone, the speaker, and the communication circuit, and a memory electrically connected to the processor, wherein the memory is configured to store at least one application program, and wherein the processor, upon execution of instructions of the at least one application program, is configured to receive a first user input including a request for performing a first task that requires at least one parameter for execution and not including an entirety of the at least one parameter, transmit first data related to the first user input to an external server through the communication circuit, receive a first sequence of states of the electronic device for performing the first task from the external server through the communication circuit, perform not all but some of the first sequence of the states while displaying at least some of states changed in the first sequence through the display, by the electronic device, and after the performing of the some of the first sequence, display a GUI that is required for performing the first task and represents that a user is requested to provide at least one parameter omitted in the first user input in a part of the display.

In accordance with another aspect of the disclosure, an electronic device that supports an operation of a speech recognition service is provided. The electronic device includes a memory configured to store at least one application, a display configured to output an execution screen of the application, a microphone configured to receive a speech signal, a communication circuit configured to perform communication with at least one external device, and a processor electrically connected to the memory, the display, the microphone, and the communication circuit. The processor is configured to in relation to a request for performance of a task of the electronic device, receive a first user input not including at least some of one or more pieces of parameter information that is necessary for performance of the task and transmit the first user input to a first external device, receive a first sequence including at least one unit operation created based on the first user input in relation to performance of the task of the electronic device from the first external device, output a result screen by performing a first unit operation included in the first sequence, at a time point of performance of a second unit operation that is performed based on first parameter information sequentially included in the first sequence after the first unit operation and not included in the first user input, determine whether the first parameter information of the first user input is omitted, determine an attribute of the first parameter information, and display a specific GUI in an area of the result screen of the first unit operation, which corresponds to an attribute of the first parameter information.

In accordance with another aspect of the disclosure, a method for operating a speech recognition service of an electronic device is provided. The method includes in relation to a command on performance of a task of the electronic device, receiving a first user input not including at least some of one or more pieces of parameter information that is necessary for performance of the task, transmitting the first user input to a first external device, receiving a first sequence including at least one unit operation created based on the first user input in relation to performance of the task of the electronic device from the first external device, at a time point of performance a second unit operation that is performed based on first parameter information sequentially included in the first sequence after a first unit operation and not included in the first user input, determining whether the first parameter information of the first user input is omitted, determining an attribute of the first parameter information; and displaying a specific GUI in an area of a screen of the electronic device, which corresponds to an attribute of the first parameter information.

According to various embodiments, the processing efficiency of a speech input according to an utterance of the user may be improved by inducing an additional input through a GUI when the utterance of the user is insufficient.

According to various embodiments, a request for an additional input may be explicitly provided by displaying the GUI in a screen area related to an attribute of information omitted from the utterance of the user.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
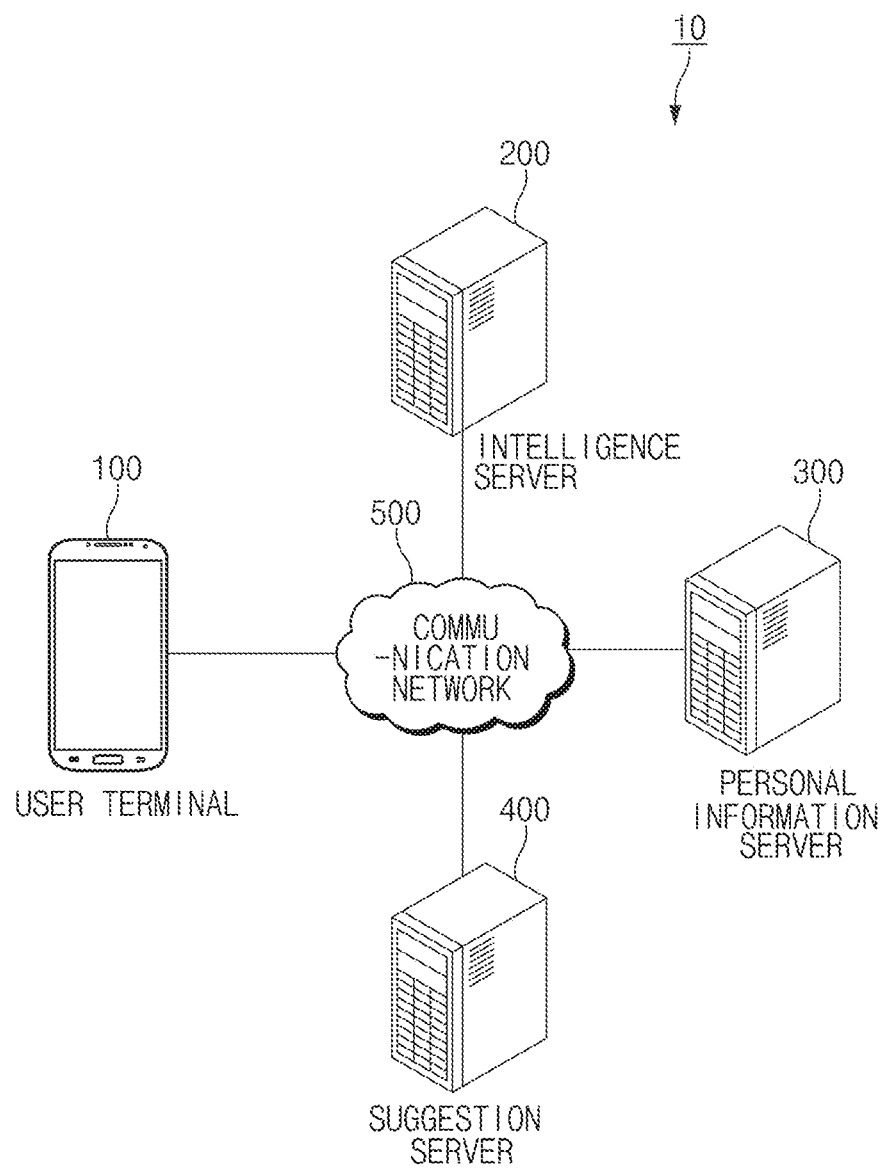
FIG. 1 is a view illustrating an integrated intelligence system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the disclosure, but are not intended to limit the elements. For instance, "a first user device" and "a second user device" may indicate different users regardless of order or importance. For example, a first component may be referred to as a second component and vice versa without departing from the scope of the disclosure.

In various embodiments of the disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the disclosure are used to describe certain embodiments of the disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the specification are not intended to be interpreted as excluding embodiments of the disclosure.

An electronic device according to various embodiments of the disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit).

In some various embodiments of the disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or Play Station™), an electronic dictionary, an electronic key, a camcorder, or an electronic picture frame.

In other various embodiments of the disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the disclosure may be a flexible device. An electronic device according to an embodiment of the disclosure is not limited to the above-mentioned devices, and may include new electronic devices with the development of new technology.

Hereinafter, an electronic device according to various embodiments of the disclosure will be described in more detail with reference to the accompanying drawings. The term "user" used herein may refer to a person who uses an electronic device or may refer to a device (e.g., an artificial intelligence electronic device) that uses an electronic device.

Prior to describing various embodiments of the disclosure, an integrated intelligent system to which various embodiments of the disclosure is capable of being applied will be described with reference to FIGS. 1 to 6.

FIG. 1 is a view illustrating an integrated intelligence system according to an embodiment of the disclosure.

Referring to FIG. 1, an integrated intelligent system 10 may include a user terminal 100, an intelligence server 200, a personal information server 300, a suggestion server 400, and a communication network 500.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, speech input, a remote input, or the like.

According to an embodiment of the disclosure, various types of terminal devices (or an electronic device), which are connected with an Internet, such as a mobile phone, a smartphone, a personal digital assistant (PDA), a notebook computer, and the like, may be the user terminal 100.

According to an embodiment of the disclosure, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a speech input of a user from the user terminal 100 over a communication network and may change the speech input to text data. In another embodiment, the intelligence server 200 may generate (or select) a path rule based on the text data. The path rule may include information about an action (or an operation) for performing the function of an app or information about a parameter necessary to perform the action. In addition, the path rule may include the sequence of actions of the app (or the sequence of states).

The user terminal 100 may receive the path rule, may select an app depending on the path rule, and may execute an action included in the path rule in the selected app. For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action among a plurality of actions, in the display. For another example, the user terminal 100 may display the result obtained by executing the action in the display, in response to the user input.

The personal information server 300 may include a database in which information about user or a user terminal 100 is stored. For example, the personal information server 300 may receive the user information (e.g., context information, name information, age information, gender information, address information, occupation information, health information, financial information, user preference information or the like) from the user terminal 100 to store the user information in the database. Alternatively, the personal information server 300 may receive usage information (e.g., app installation information, app execution information, call information, battery information, location information, or communication information) of the user terminal 100 from the user terminal 100 to store the usage information in the database.

The intelligence server 200 may be used to receive the user information or information of the user terminal 100 from the personal information server 300 over the communication network and to generate a path rule associated with the user input.

According to an embodiment of the disclosure, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the received information to the user.

Figure 2:
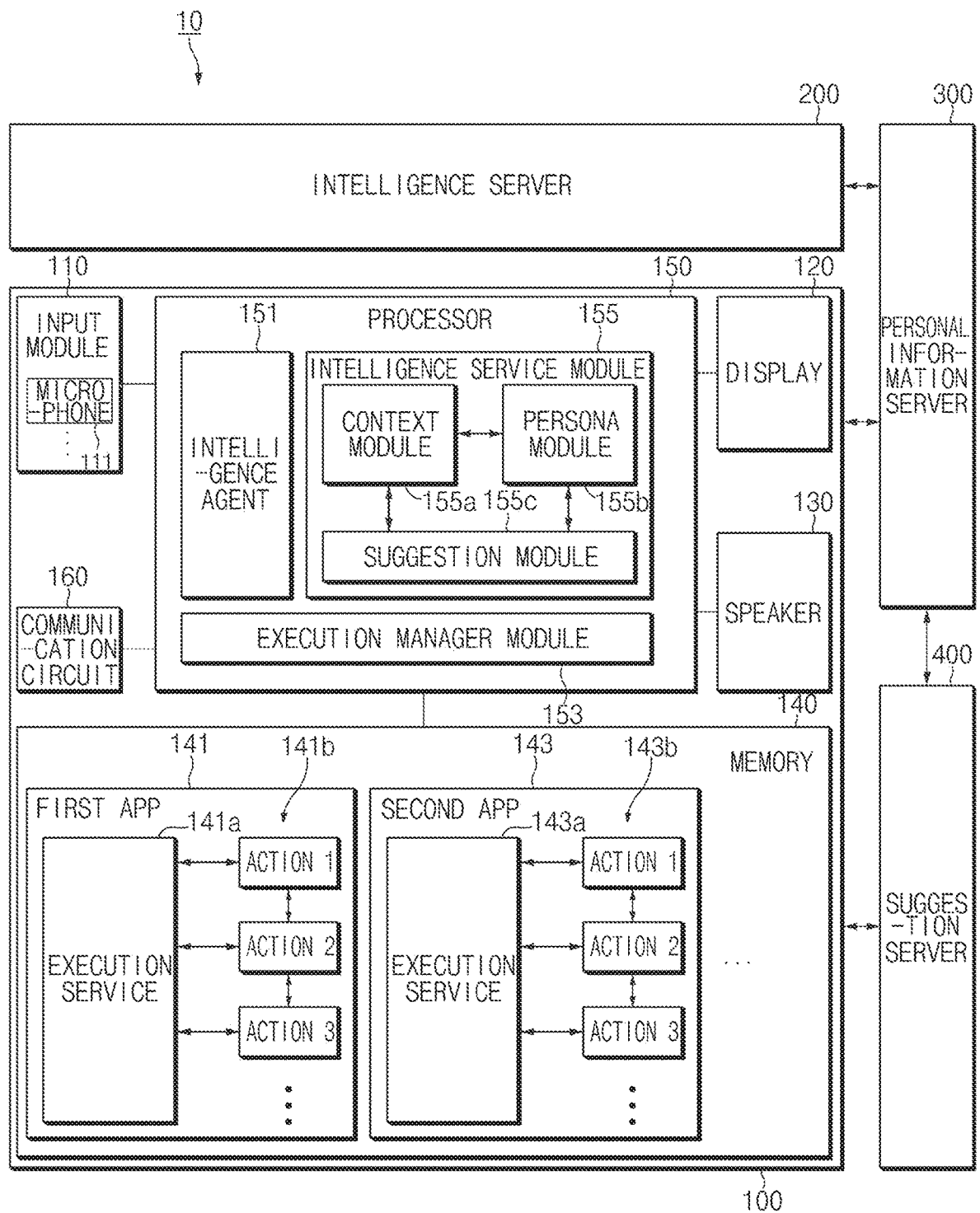
FIG. 2 is a view illustrating a user terminal of an integrated intelligence system according to an embodiment of the disclosure.

FIG. 2 is a view illustrating a user terminal of an integrated intelligence system according to an embodiment of the disclosure.

Referring to FIG. 2, the user terminal 100 may include an input module 110, a display 120, a speaker 130, a memory 140, a processor 150, or a communication circuit 160. Some elements (e.g., 110, 120, 130, 140, or 160) of the user terminal 100 may be electrically connected to the processor 150. The user terminal 100 may further include a housing, and elements of the user terminal 100 may be seated in the housing or may be positioned on the housing. In various embodiments, the user terminal 100 may be referred to as an "electronic device (or user device)". In addition, the user terminal 100 may not include at least one of the above-described elements or may further include any other element (s). For example, the user terminal 100 may include elements of an electronic device 1101 illustrated in FIG. 11.

According to an embodiment of the disclosure, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100). According to an embodiment, the input module 110 may include a microphone 111 that is capable of receiving the speech of the user as a speech signal. For example, the input module 110 may include a speech input system and may receive the speech of the user as the speech signal through the speech input system.

According to an embodiment of the disclosure, the display 120 may display an image, a video, and/or an execution screen of an application. For example, the display 120 may display a graphic user interface (GUI) of an app. In an embodiment, at least part of the display 120 may be exposed through one area of the housing.

According to an embodiment of the disclosure, the speaker 130 may output a sound signal. For example, the speaker 130 may output the sound signal generated in the user terminal 100 or the sound signal received from an external device to the outside.

According to an embodiment of the disclosure, the memory 140 may store a plurality of apps 141 and 143. The plurality of apps 141 and 143 stored in the memory 140 may be selected, launched, and executed depending on the user input. The plurality of apps 141 and 143 may include an application (e.g., a photo app, a music app, a calendar app, a message app, a call app, or the like) supporting the function execution of the user terminal 100 and an intelligence app that supports the operation of the speech recognition service.

According to an embodiment of the disclosure, the memory 140 may include a database capable of storing information necessary to recognize the user input. For example, the memory 140 may include a log database capable of storing log information. For another example, the memory 140 may include a persona database capable of storing user information.

According to an embodiment of the disclosure, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of actions (or unit actions) 141b and 143b. The execution services 141a and 143a may be generated by the execution manager module 153 of the processor 150 and then may execute the plurality of actions 141b and 143b.

According to an embodiment of the disclosure, when the actions 141b and 143b of the apps 141 and 143 are executed, an execution state screen according to the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not input).

According to an embodiment of the disclosure, the execution services 141a and 143a may execute the actions 141b and 143b depending on a path rule. For example, the execution services 141a and 143a may be activated by the execution manager module 153, may receive an execution request from the execution manager module 153 depending on the path rule, and may execute the actions 141b and 143b of the apps 141 and 143 depending on the execution request. If the execution of the actions 141b and 143b is completed, the execution services 141a and 143a may transmit completion information to the execution manager module 153.

According to an embodiment of the disclosure, in the case where the plurality of the actions 141b and 143b are respectively executed in the apps 141 and 143, the plurality of the actions 141b and 143b may be sequentially executed. If the execution of one action (action 1) is completed, the execution services 141a and 143a may open the next action (action 2) and may transmit completion information to the execution manager module 153. Here, it is understood that opening an arbitrary action is to change a state of the arbitrary action to an executable state or to prepare the execution of the arbitrary action. In other words, if the arbitrary action is not opened, the corresponding action may be not executed. If the completion information is received, the execution manager module 153 may transmit an execution request for the next actions 141b and 143b to an execution service (e.g., action 2). According to an embodiment of the disclosure, in the case where the plurality of apps 141 and 143 are executed, the plurality of apps 141 and 143 may be sequentially executed. For example, if receiving the completion information after the execution of the last action of the first app 141 is executed, the execution manager module 153 may transmit the execution request of the first action of the second app 143 to the execution service 143a.

According to an embodiment of the disclosure, in the case where the plurality of the actions 141b and 143b are executed in the apps 141 and 143, a result screen according to the execution of each of the executed plurality of the actions 141b and 143b may be displayed in the display 120. According to an embodiment, only a part of a plurality of result screens according to the executed plurality of the actions 141b and 143b may be displayed in the display 120.

According to an embodiment of the disclosure, the memory 140 may store an intelligence app (e.g., the speech recognition app) operating in conjunction with an intelligence agent 151. The app operating in conjunction with the intelligence agent 151 may receive and process the utterance of the user as a speech signal. According to an embodiment, the app operating in conjunction with the intelligence agent 151 may be operated by a specific input (e.g., an input through a hardware key, an input through a touch screen, or a specific speech input) input through the input module 110.

According to an embodiment of the disclosure, the processor 150 may control overall actions of the user terminal 100. For example, the processor 150 may control the input module 110 to receive the user input. The processor 150 may control the display 120 to display an image. The processor 150 may control the speaker 130 to output the speech signal. The processor 150 may control the memory 140 to read or store necessary information.

According to an embodiment of the disclosure, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the disclosure may be implemented by hardware or by software. In various embodiments of the disclosure, it is understood that the action executed by the intelligence agent 151, the execution manager module 153, or the intelligence service module 155 is an action executed by the processor 150.

According to an embodiment of the disclosure, the intelligence agent 151 may generate an instruction for operating an app based on the speech signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200. According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user speech included in the user input to search for a part in which the user speech is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment of the disclosure, an intelligence agent 151 may include a wakeup recognition module recognizing a call of a user. The wakeup recognition module may recognize a wakeup instruction of the user through the speech recognition module. In the case where the wakeup recognition module receives the wakeup instruction, the wakeup recognition module may activate the intelligence agent 151 to receive the user input. According to an embodiment, the wakeup recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed. According to an embodiment of the disclosure, the intelligence agent 151 may include a speech recognition module for performing the user input. The speech recognition module may recognize the user input for executing an action in an app. For example, the speech recognition module may recognize a limited user (speech) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment of the disclosure, the speech recognition module (including the speech recognition module of a wake up module) of the intelligence agent 151 may recognize the user input by using an algorithm for recognizing speech. For example, the algorithm for recognizing the speech may be at least one of a hidden markov model (HMM) algorithm, an artificial neural network (ANN) algorithm, or a dynamic time warping (DTW) algorithm.

According to an embodiment of the disclosure, the intelligence agent 151 may change the speech input of the user to text data. According to an embodiment, the intelligence agent 151 may transmit the speech of the user to the intelligence server 200 to receive the changed text data. As such, the intelligence agent 151 may display the text data in the display 120.

According to an embodiment of the disclosure, the intelligence agent 151 may receive a path rule from the intelligence server 200. According to an embodiment, the intelligence agent 151 may transmit the path rule to the execution manager module 153.

According to an embodiment of the disclosure, the intelligence agent 151 may transmit the execution result log according to the path rule received from the intelligence server 200 to the intelligence service module 155, and the transmitted execution result log may be accumulated and managed in preference information of the user of a persona module 155*b*.

According to an embodiment of the disclosure, the execution manager module 153 may receive the path rule from the intelligence agent 151 to execute the apps 141 and 143 and may allow the apps 141 and 143 to execute the actions 141*b* and 143*b* included in the path rule. For example, the execution manager module 153 may transmit instruction information for executing the actions 141*b* and 143*b* to the apps 141 and 143 and may receive completion information of the actions 141*b* and 143*b* from the apps 141 and 143.

According to an embodiment of the disclosure, the execution manager module 153 may transmit or receive the instruction information for executing the actions 141*b* and 143*b* of the apps 141 and 143 between the intelligence agent 151 and the apps 141 and 143. The execution manager module 153 may bind the apps 141 and 143 to be executed depending on the path rule and may transmit the instruction information of the actions 141*b* and 143*b* included in the path rule to the apps 141 and 143. For example, the execution manager module 153 may sequentially transmit the actions 141*b* and 143*b* included in the path rule to the apps 141 and 143 and may sequentially execute the actions 141*b* and 143*b* of the apps 141 and 143 depending on the path rule.

According to an embodiment of the disclosure, the execution manager module 153 may manage execution states of the actions 141*b* and 143*b* of the apps 141 and 143. For example, the execution manager module 153 may receive information about the execution states of the actions 141*b* and 143*b* from the apps 141 and 143. For example, in the case where the execution states of the actions 141*b* and 143*b* are in partial landing (e.g., in the case where a parameter necessary for the actions 141*b* and 143*b* are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the actions 141*b* and 143*b* are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141*b* and 143*b* to a new parameter by using the received parameter information.

According to an embodiment of the disclosure, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment of the disclosure, the execution manager module 153 may receive a plurality of path rules. The execution manager module 153 may select a plurality of path rules based on the utterance of the user. For example, in the case where the user utterance specifies the app 141 executing a part of the action 141*b* but does not specify the app 143 executing any other action 143*b*, the execution manager module 153 may receive a plurality of different path rules in which the same app 141 (e.g., a gallery app) executing the part of the action 141*b* is executed and in which different apps 143 (e.g., a message app or a Telegram app) executing the other action 143*b*. For example, the execution manager module 153 may execute the same actions 141*b* and 143*b* (e.g., the same successive actions 141*b* and 143*b*) of the plurality of path rules. In the case where the execution manager module 153 executes the same action, the execution manager module 153 may display a state screen for selecting the different apps 141 and 143 included in the plurality of path rules in the display 120.

According to an embodiment of the disclosure, the intelligence service module 155 may include a context module 155*a*, a persona module 155*b*, or a proposal module 155*c*.

The context module 155*a* may collect current states of the apps 141 and 143 from the apps 141 and 143. For example, the context module 155*a* may receive context information indicating the current states of the apps 141 and 143 to collect the current states of the apps 141 and 143.

The persona module 155*b* may manage personal information of the user utilizing the user terminal 100. For example, the persona module 155*b* may collect the usage information and the execution result of the user terminal 100 to manage personal information of the user.

The proposal module 155*c* may predict the intent of the user to recommend an instruction to the user. For example, the proposal module 155*c* may recommend an instruction to the user in consideration of the current state (e.g., a time, a place, context, or an app) of the user.

A communication circuit 160 (or communication module) according to an embodiment may establish wired communication or wireless communication according to the defined protocol with at least one external device (e.g., the intelligence server 200, the personal information server 300 or the server 400) of an integrated intelligent system 10. The communication circuit 160 may transmit or receive at least one information associated with the operation of the speech recognition service based on the wired communication or the wireless communication.

Figure 3:
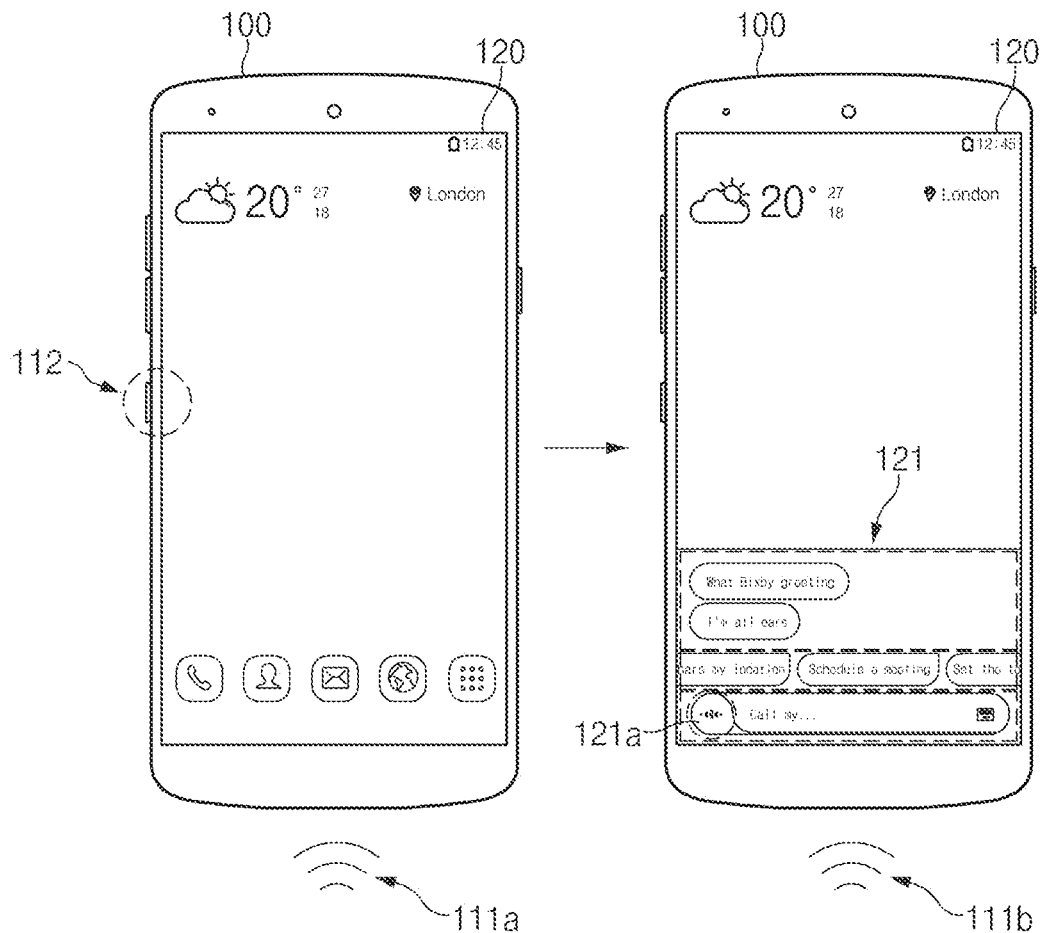
FIG. 3 is a view illustrating that an intelligence application of a user terminal is executed according to an embodiment of the disclosure.

FIG. 3 is a view illustrating that an intelligence application of a user terminal is executed according to an embodiment of the disclosure.

FIG. 3 illustrates that the user terminal 100 receives a user input to execute an intelligence app (e.g., a speech recognition app) operating in conjunction with the intelligence agent 151.

According to an embodiment of the disclosure, the user terminal 100 may execute the intelligence app for recognizing speech through a hardware key 112. For example, in the case where the user terminal 100 receives the user input through the hardware key 112, the user terminal 100 may display a UI 121 of the intelligence app in the display 120. For example, a user may touch a speech recognition button 121*a* of the UI 121 of the intelligence app for the purpose of entering speech 111*b* in a state where the UI 121 of the intelligence app is displayed in the display 120. For another example, while continuously pressing the hardware key 112 to enter the speech 111*b*, the user may enter the speech 111*b*.

According to an embodiment of the disclosure, the user terminal 100 may execute the intelligence app for recognizing the speech through the microphone 111. For example, in the case where a specified speech 111*a* (e.g., wake up!) is entered through the microphone 111, the user terminal 100 may display a UI 121 of the intelligence app in the display 120.

Figure 4:
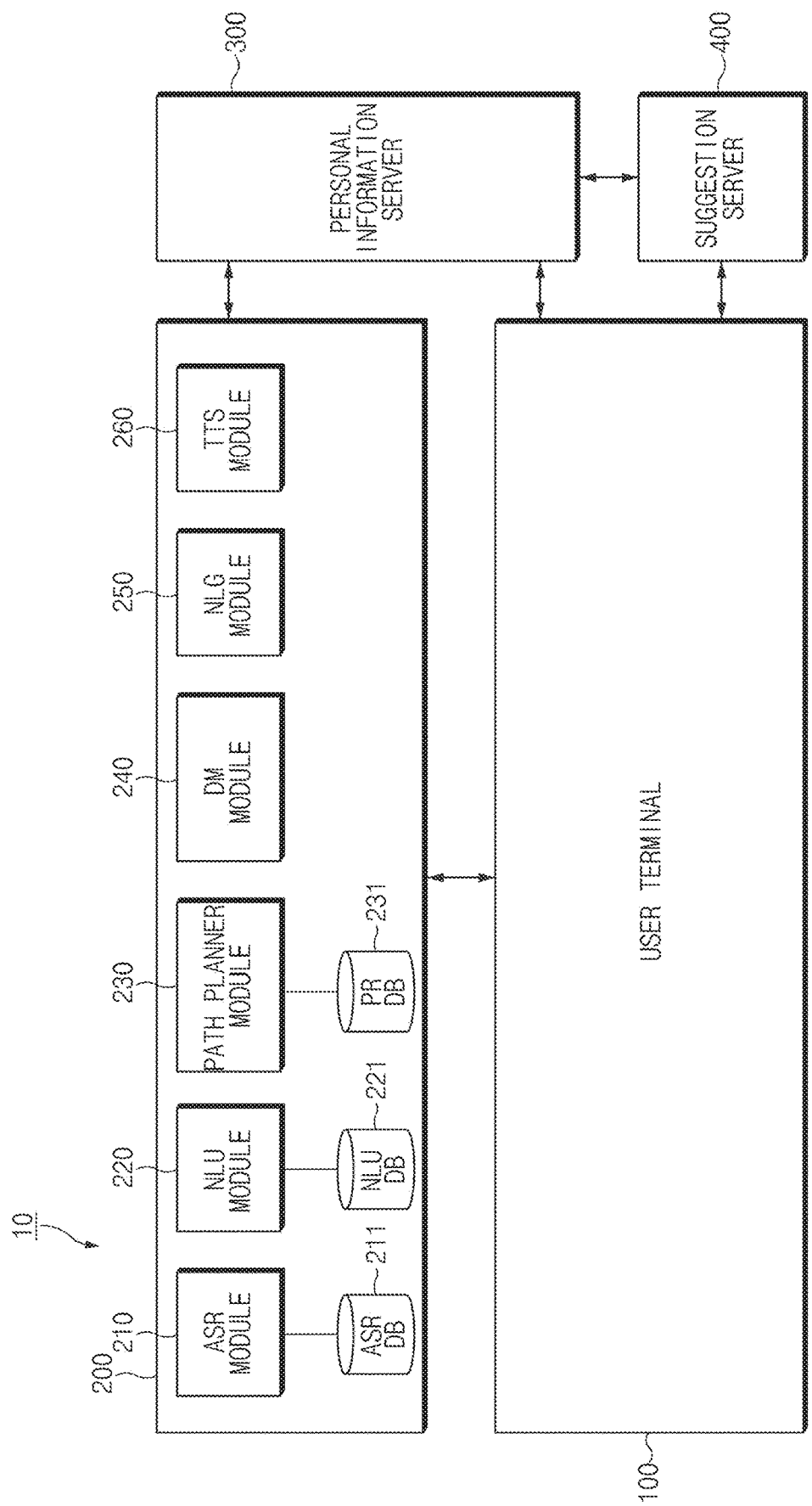
FIG. 4 is a view illustrating an intelligent server of an integrated intelligence system according to an embodiment of the disclosure.

FIG. 4 is a view illustrating an intelligent server of an integrated intelligence system according to an embodiment of the disclosure.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. The elements 210, 220, 230, 240, 250, or 260 of the above-described intelligence server 200 may be implemented individually, or at least some of the elements may be integrated. In an embodiment, intelligence server 200 may include a controller (or a processor), which generally controls the function operation of the elements 210, 220, 230, 240, 250, or 260, and a communication interface (or a communication module) supporting communication network access. Moreover, the intelligence server 200 may include a storage device (or a memory) including the element 210, 220, 230, 240, 250, or 260.

The NLU module 220 or the path planner module 230 of the intelligence server 200 may generate a path rule.

According to an embodiment of the disclosure, the ASR module 210 may convert the user input received from the user terminal 100 to text data. For example, the ASR module 210 may include a speech recognition module. The speech recognition module may include an acoustic model and a language model. For example, the acoustic model may include information associated with a speech, and the language model may include unit phoneme information and information about a combination of unit phoneme information. The speech recognition module may change user speech to text data by using the information associated with speech and unit phoneme information. For example, the information about the acoustic model and the language model may be stored in an automatic speech recognition database (ASR DB) 211. In an embodiment, the ASR module 210 may generate a speaker-dependent recognition model based on a user input that is received first and may store the generated model in the database ASR DB 211.

According to an embodiment of the disclosure, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, and the like. As such, the NLU module 220 may obtain a domain, intent, or a parameter (or a slot) necessary for the user input to express the intent.

According to an embodiment of the disclosure, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment of the disclosure, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the speech of the user with reference to the PLM stored in the NLU DB 221.

According to an embodiment of the disclosure, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action to be executed in the app, and a parameter necessary to execute the action.

According to an embodiment of the disclosure, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment of the disclosure, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment of the disclosure, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment of the disclosure, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment of the disclosure, the path planner module 230 may select at least one path rule of the plurality of path rules.

According to an embodiment of the disclosure, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment of the disclosure, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment of the disclosure, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment of the disclosure, the path planner module 230 may store the path rule generated by the NLU module 220 in the PR DB 231. The generated path rule may be added to the path rule set stored in the PR DB 231.

According to an embodiment of the disclosure, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment of the disclosure, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment of the disclosure, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment of the disclosure, the NLG module 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a speech form after being transmitted to the TTS module 2.

According to an embodiment of the disclosure, the TTS module 260 may change information of the text form to information of the speech form. The TTS module 260 may receive the information of the text form from the NLG module 250, may change the information of the text form to the information of a speech form, and may transmit the information of the speech form to the user terminal 100. The user terminal 100 may output the information of the speech form to the speaker 130.

According to an embodiment of the disclosure, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
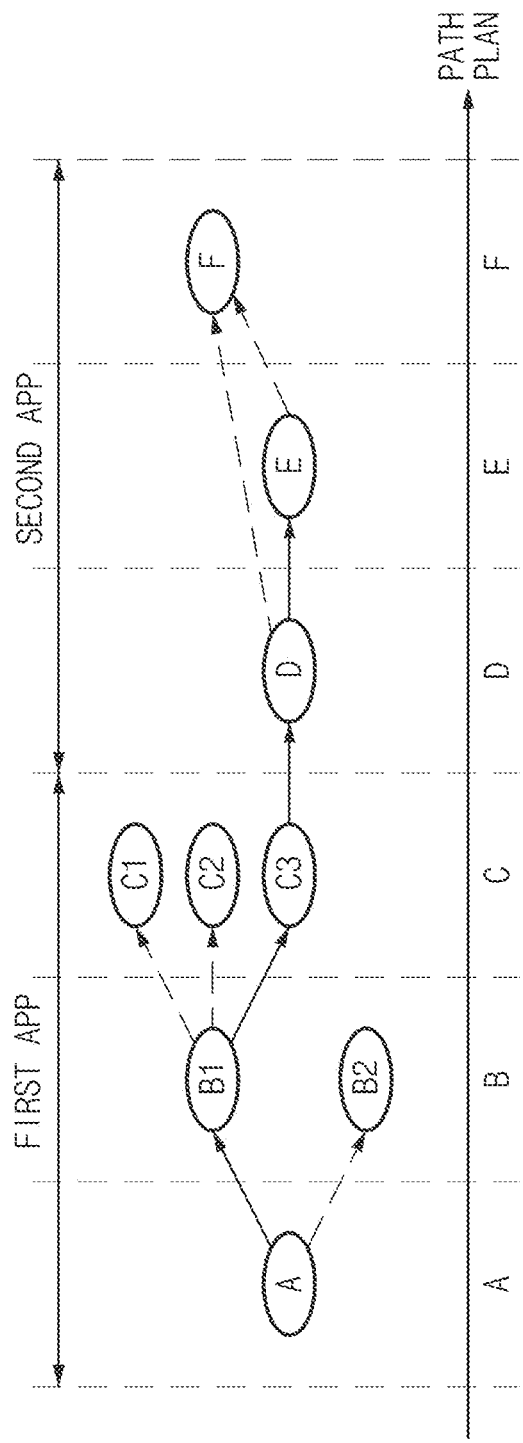
FIG. 5 is a view illustrating a manner of creating a path rule by a natural language understanding module according to an embodiment of the disclosure.

FIG. 5 is a view illustrating a manner of creating a path rule by a natural language understanding module according to an embodiment of the disclosure.

Referring to FIG. 5, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to an embodiment of the disclosure, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment of the disclosure, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment of the disclosure, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment of the disclosure, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment of the disclosure, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment of the disclosure, in the case where a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to an embodiment of the disclosure, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may make a request for the missed information to receive an additional input or may determine a path rule corresponding to the user input by using user information.

Figure 6:
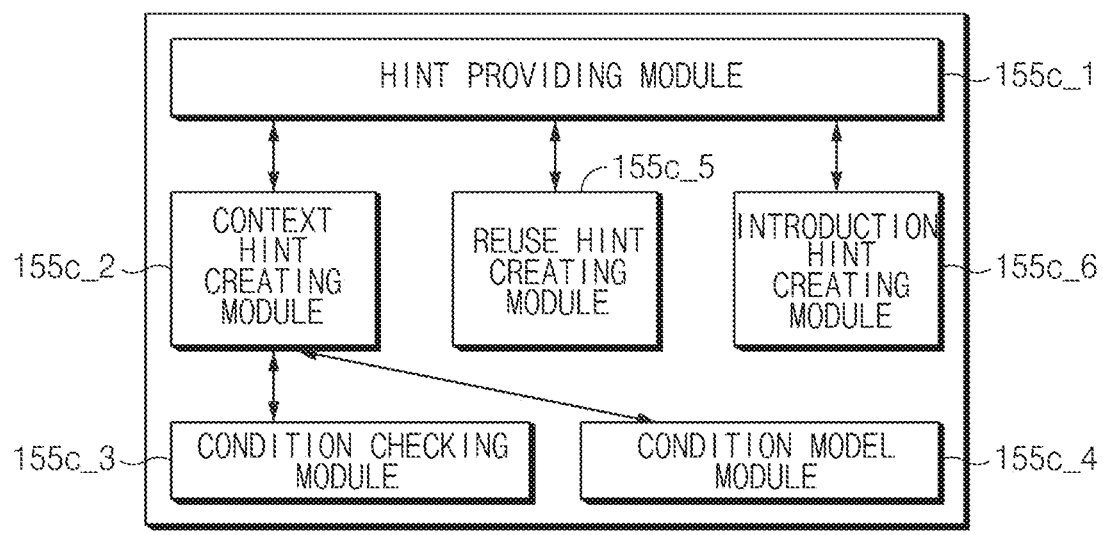
FIG. 6 is a view illustrating a suggestion module according to an embodiment of the disclosure.

FIG. 6 is a view illustrating a suggestion module according to an embodiment of the disclosure.

Referring to FIG. 6, the suggestion module 155c may include a hint providing module 155c_1, a context hint creating module 155c_2, a condition checking module 155c_3, a condition model module 155c_4, a reuse hint creating module 155c_5, or an introduction hint creating module 155c_6.

According to an embodiment of the disclosure, the hint providing module 155c_1 may provide the user with a hint. For example, the hint providing module 155c_1 may receive a created hint from the context hint creating module 155c_2, the reuse hint creating module 155c_5, or the introduction hint creating module 155c_6 and may provide the user with the hint.

According to an embodiment of the disclosure, the context hint creating module 155c_2 may create a hint that may be recommended according to a current state through the condition checking module 155c_3 or the condition model module 155c_4. The condition checking module 155c_3 may receive information corresponding to a current state through the intelligent service module 155, and the condition model module 155c_4 may set a condition model by using the received information. For example, the condition model module 155c_4 may provide a time, a location, a situation, and a used app at a time point at which a hint is provided to the user, and may provide hints that may be used in the corresponding condition to the user in the order of higher priorities.

According to an embodiment of the disclosure, the reuse hint creating module 155c_5 may create a hint that may be recommended in consideration of a use frequency according to a current state. For example, the reuse hint creating module 155c_5 may create a hint in consideration of a use pattern of the user.

According to an embodiment of the disclosure, the introduction hint creating module 155c_6 may create a hint that introduces a new function or a function frequently used by another user. For example, the hint that introduces the new function may include an introduction (e.g., an operation method) on an intelligence agent 151.

According to embodiment of the disclosure, the context hint creating module 155c_2, the condition checking module 155c_3, the condition model module 155c_4, the reuse hint creating module 155c_5, or the introduction hint creating module 155c_6 of the suggestion module 155c may be included in a personalization information server 300. For example, the hint providing module 155c_1 of the suggestion module 155c may receive a hint from the context hint creating module 155c_2, the reuse hint creating module 155c_5, or the introduction hint creating module 155c_6 of the user personalization information server 300, and may provide the received hint to the user.

According to an embodiment of the disclosure, a user terminal 100 may provide a hint according to the following series of processes. For example, if receiving a request for provision of a hint from the intelligence agent 151, the hint providing module 155c_1 may transmit a request for creation of a hint to the context hint creating module 155c_2. If receiving the request for creation of a hint, the context hint creating module 155c_2 may receive information corresponding to a current state from the context module 155a and the persona module 155b by using the condition checking module 155c_3. The condition checking module 155c_3 may transmit the received information to the condition model module 155c_4, and the condition model module 155c_4 may endow the hints provided to the user with priorities in the order of the high possibilities of use in the condition. The context hint creating module 155c_2 may identify the condition, and may create a hint corresponding to the current state. The context hint creating module 155c_2 may transmit the created hint to the hint providing module 155c_1. The hint providing module 155c_1 may arrange the hints according to a specific rule, and may transmit the hints to the intelligence agent 151.

According to an embodiment of the disclosure, the hint providing module 155c_1 may create a plurality of context hints, and may designate priorities to the plurality of context hints according to the specific rule. According to an embodiment, the hint providing module 155c_1 may provide first one of the plurality of context hints, which has the highest priority, to the user According to an embodiment of the disclosure, a user terminal 100 may suggest hints according to use frequencies. For example, if receiving a request for provision of a hint from the intelligence agent 151, the hint providing module 155c_1 may transmit a request for creation of a hint to the reuse hint creating module 155c_5. If receiving the request for creation of a hint, the reuse hint creating module 155c_5 may receive user information from the persona module 155b. For example, the reuse hint creating module 155c_5 may receive a path rule included in preference information of the user of the persona module 155b, a parameter included in the path rule, an execution frequency of an app, and information on a space-time at which the app is used. The reuse hint creating module 155c_5 may create a hint corresponding to the received user information. The reuse hint creating module 155c_5 may transmit the created hint to the hint providing module 155c_1. The hint providing module 155c_1 may arrange the hints, and may transmit the hints to the intelligence agent 151.

According to an embodiment of the disclosure, the user terminal 100 may suggest a hint for a new function. For example, if receiving a request for provision of a hint from the intelligence agent 151, the hint providing module 155c_1 may transmit a request for creation of a hint to the introduction hint creating module 155c_6. The introduction hint creating module 155c_6 may transmit a request for provision of an introduction hint to the suggestion server 400 and may receive information on a function that is to be introduced, from the suggestion server 400. For example, the suggestion server 400 may store information on the function that is to be introduced, and a hint list for the function that is to be introduced may be updated by a service operator. The introduction hint creating module 155c_6 may transmit the created hint to the hint providing module 155c_1. The hint providing module 155c_1 may arrange the hints, and may transmit the hints to the intelligence agent 151.

Accordingly, the suggestion module 155c may provide the user with a hint created by the context hint creating module 155c_2, the reuse hint creating module 155c_5, or the introduction hint creating module 155c_6. For example, the suggestion module 155c may display the created hint in an app that operates the intelligence agent 151, and may receive an input for selecting the hint from the user through the app.

Figure 7:
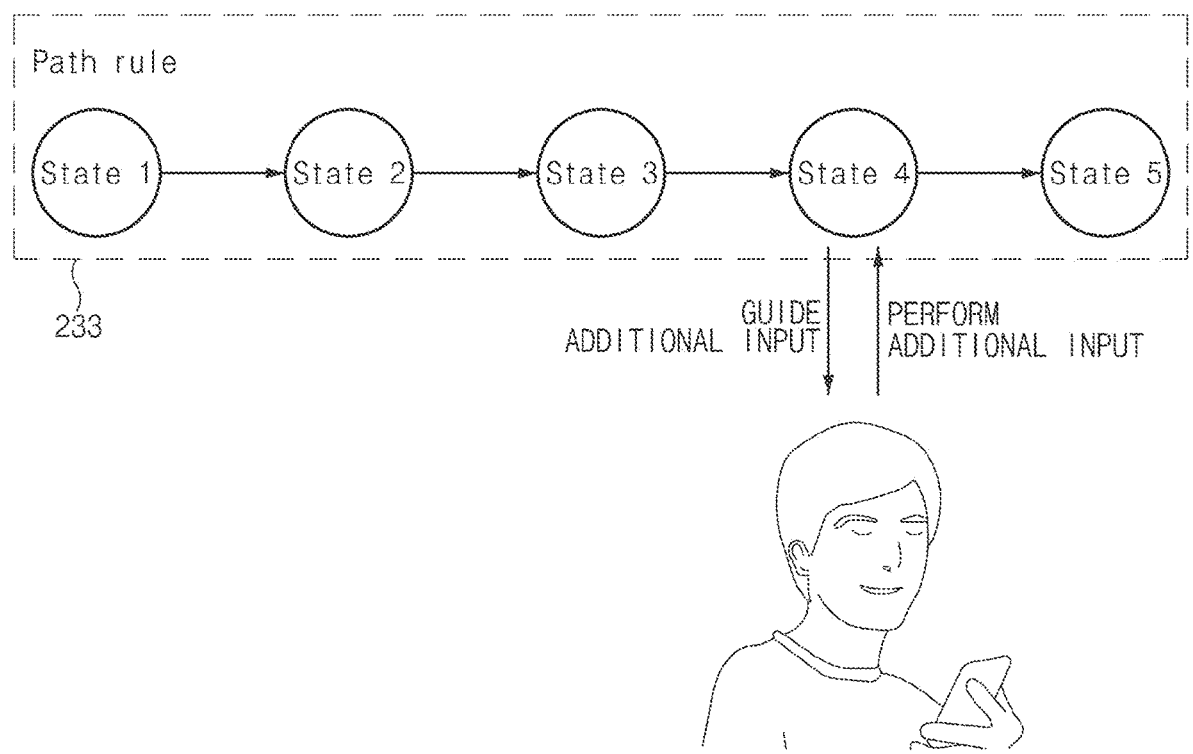
FIG. 7 is a view schematically illustrating an operation of a user terminal against insufficient utterance according to an embodiment of the disclosure.

FIG. 7 is a view schematically illustrating an operation of a user terminal against insufficient utterance according to an embodiment of the disclosure.

As described above, the user terminal 100 (see FIG. 1) may transmit a user input (or a speech input) according to utterance of the user related to performance of a specific function (or a task) to the intelligent server 200 (see FIG. 1), and may receive a path rule (or a sequence) corresponding to the utterance of the user from the intelligent server 200. In this operation, when the utterance of the user is simple or ambiguous, the user terminal 100 may receive a path rule in an incomplete state from the intelligent server 200. For example, when the user utters "Send a message!", information (a wording required to process the utterance of the user) such as a message receiver or contents of the message is omitted from the utterance so that parameter information for performing the corresponding operation may be omitted from at least a party of a least one unit operation (or a state of the user terminal 100) that constitutes a path rule. In this regard, when receiving an incomplete path rule from the intelligence server 200, the user terminal 100 according to an embodiment may request an additional information input of the user by outputting a specific GUI at a specific time point (e.g., a performance completion time point to a unit operation (or a state) that may be performed). The user terminal 100 may support refinement of a path rule of the intelligence server 200 based on the input additional information, and may complete processing of the utterance of the user based on the refined path rule (or to which parameter information acquired from the additional information is added). Hereinafter, an embodiment of obtaining additional information of the user terminal 100 for an incomplete path rule, and functional operations of the user terminal 100 and the intelligence server 200 that realize the embodiment will be described.

Referring to FIG. 7, the user terminal 100 may receive a path rule 233 (or a sequence) from the intelligence server 200 according to an utterance of the user including a specific intention or command, and may perform at least one unit operation (e.g., state 1 to state 5) based on the path rule 233. In an embodiment, the path rule 233 received by the user terminal 100 may be understood as a state in which parameter information that is necessary for performing a specific unit operation (e.g., state 5) in the path rule 233 is omitted, according to the insufficiency of the utterance of the user.

According to an embodiment of the disclosure, the user terminal 100 may perform first to fourth unit operations (e.g., states 1 to 4) corresponding to the parameter information included in the path rule. For example, the user terminal 100 may execute a specific app corresponding to the intention of the utterance of the user by performing the first unit operation, and may process a task according to the intention of the utterance of the user by performing the second to fourth unit operations through the specific app by stages. Thereafter, the user terminal 100 may identify omission of parameter information that is necessary for performing the fifth unit operation at a time point at which the fifth unit operation (e.g., state 5) is transited to a performable state, and may output a GUI that requests an additional information input of the user on a screen according to the performance of the fourth unit operation. In an embodiment, the GUI may be displayed as an area of the screen area related to the fourth unit operation, which corresponds to an attribute of the necessary parameter information. In the disclosure, as the parameter information that is necessary for performing the fifth unit operation is omitted, a state in which the performance of the fifth unit operation or the additional information input of the user is stood by may be named as a stop state or a partial landing state.

According to an embodiment of the disclosure, in response to the output of the GUI, the user may recognize the insufficiency of the utterance and may perform an additional information input. For example, the user may input additional information based on a speech input through an utterance or a touch input using the body of the user. In this way, a state in which additional information (or parameter information) is input by the user may be named a parameter filling state in the disclosure.

According to an embodiment of the disclosure, the user terminal 100 may transmit input additional information (or parameter information) and information (e.g., information of a performed unit operation) on a path rule received in advance to the intelligence server 200, and the intelligence server 200 may refine the path rule based on the received additional information (or add parameter information according to the path rule) to provide the refined path rule to the user terminal 100. Accordingly, the user terminal 100 may perform the fifth unit operation based on the path rule in which parameter information required in the fifth unit operation is satisfied. In an embodiment, the fifth unit operation may be determined according to information (or a parameter) that is additionally input from the user. For example, when the additional information of the user is information on the message receiver, the fifth unit operation may be an operation of searching for and selecting the receiver by the user terminal 100. Further, when the additional information is information on the contents of a message, the user terminal 100 may perform an operation of outputting and transmitting contents of the message as the fifth unit operation.

FIGS. 8A to 8D are views illustrating a signal flow between an element of the user terminal and the intelligent server and various interface outputs of the user terminal according to various embodiments of the disclosure. The signal flows described in FIGS. 8A to 8D may be understood as a series of processes in which a partial landing state is generated in a specific unit operation of a path rule (or a sequence) and then performance of at least one unit operation according to the path rule is completed via the parameter filling state.

Figure 8A:
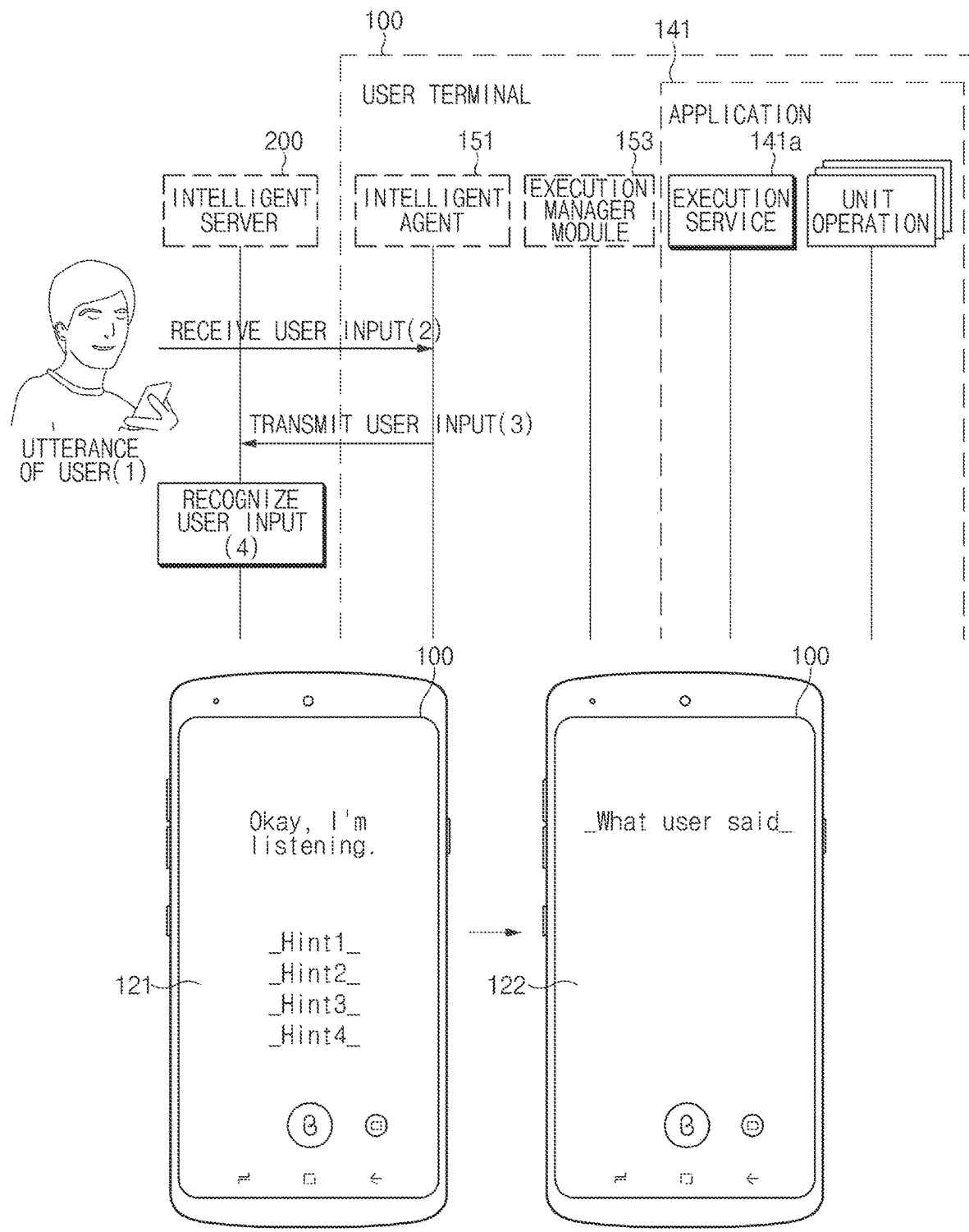
FIG. 8A is a view illustrating a first signal flow between an element of a user terminal and an intelligent server and related first and second interfaces according to an embodiment of the disclosure.

Referring to FIG. 8A, in an embodiment of the disclosure, the user may manipulate a hardware key 112 (e.g., 112 of FIG. 3) disposed in an area of the user terminal 100 in relation to an operation of a speech recognition service. In this case, the activation of the intelligence agent 151 may be triggered. Further, the user may perform an utterance of a specific wakeup command to allow a wakeup recognition module (not illustrated) of the intelligence agent 151 to activate the intelligence agent 151. The activated intelligence agent 151 may output a first interface 121 that represents a standby state for an utterance of the user (e.g., an utterance including a command or intention for performing a task) of the user in at least one area of the screen area of the display 120 (see FIG. 2). For example, the intelligence agent 151 may output the first interface 121 in which contents (e.g., a text (listening)) that represents the standby state are included.

According to an embodiment of the disclosure, in response to the output of the first interface 121, in operation 1, the user may perform an utterance including a specific intention or command. In operation 2, a user input (or a speech input) according to the utterance of the user may be delivered to the intelligence agent 151 through a microphone (e.g., 111 of FIG. 2), and may transmit a user input (or speech input data) to the intelligence server 200 through a communication network. In operation 4, the ASR module 210 (see FIG. 4) of the intelligence server 200 may perform recognition of a speech for the received user input to convert the user input to text data. In an embodiment, the text data converted by the ASR module 210 may be transmitted to the user terminal 100, and accordingly, the intelligence agent 151 may output a second interface 122 including the text data in the screen area of the display 120. In FIG. 8A, the text data (e.g., "What user says") included in the second interface 122 is exemplary, and the second interface 122 may display a text actually corresponding to the utterance of the user.

Figure 8B:
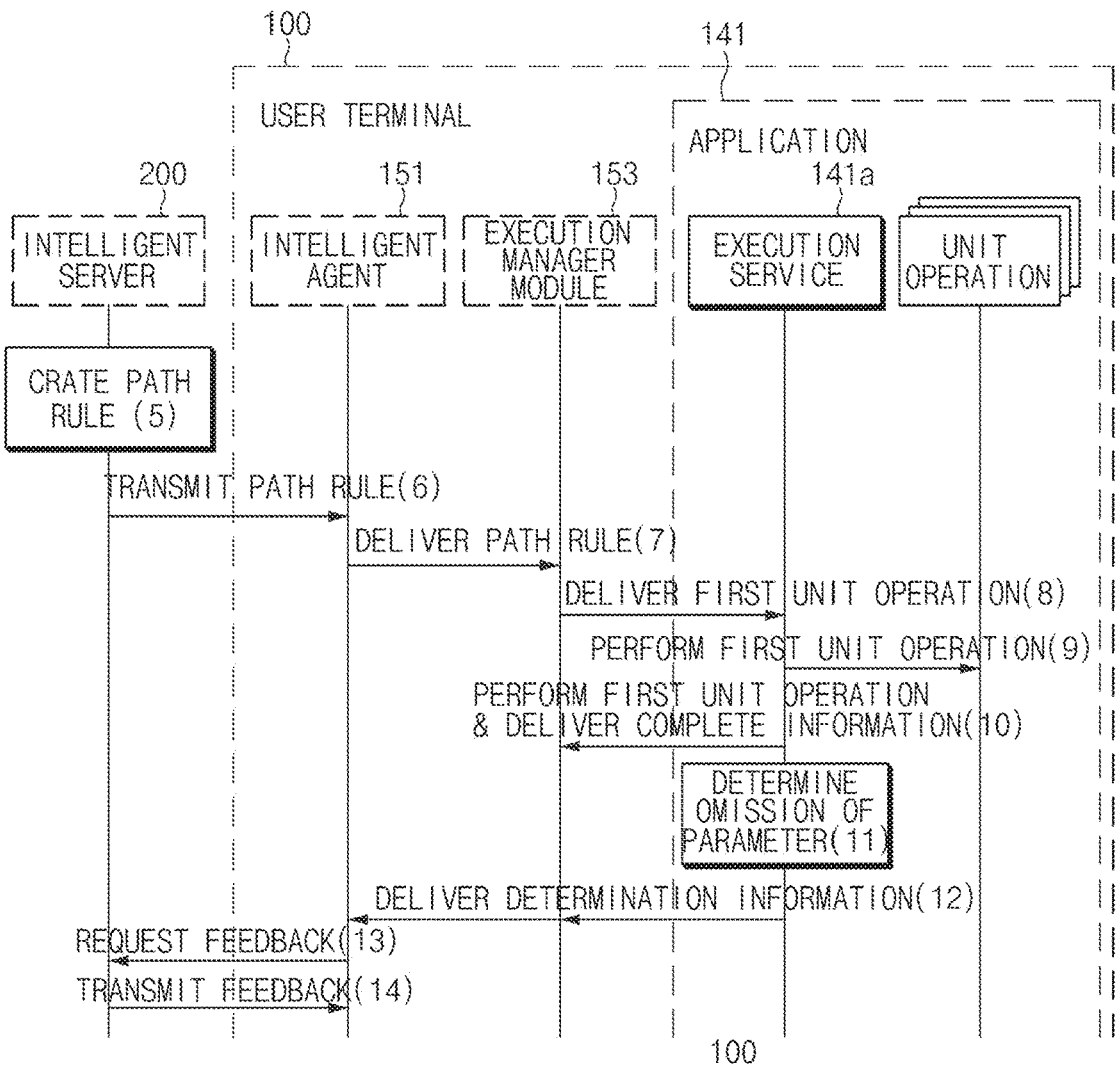
FIG. 8B is a view illustrating a second signal flow between an element of a user terminal and an intelligent server and related a third interface according to an embodiment of the disclosure.
Figure 8B:
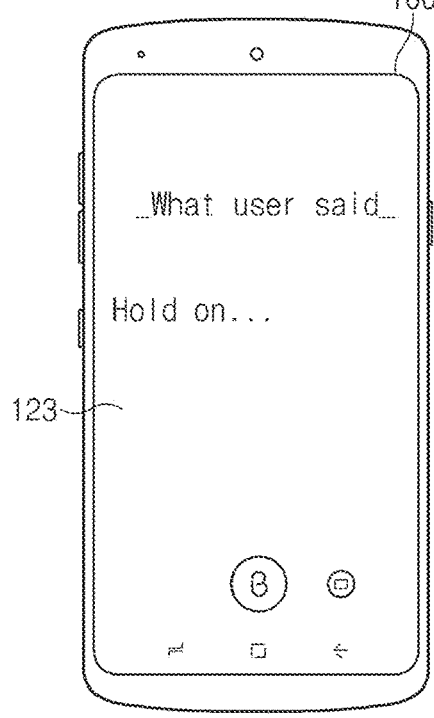

Referring to FIG. 8B, in operation 5, the NLU module 220 (see FIG. 4) of the intelligence server 200 may determine an intention of utterance of the user for a user input (or converted text data) based on a matching rule including a domain, an intention, and a parameter. The NLU module 220 may select an app that will be executed by the user terminal 100 based on an intention of an utterance of the user, and may create or select a path rule by determining a parameter corresponding to operations (or states of the user terminal 100) that are to be performed by the app. Then, the intelligence agent 151 may output a third interface 123 functioning as a notification for processing of the utterance of the user. For example, the intelligence agent 151 may output a third interface 123 in which contents (e.g., a text (Hold on)) that requests standby of the user as a part of the notification are contained. In operation 6, the NLU module 220 may transmit the created or selected path rule to the intelligence agent 151 of the user terminal 100, and in operation 7, the intelligence agent 151 may deliver the transmitted path rule to an execution manager module 153.

According to an embodiment of the disclosure, in operation 8, the execution manager module 153 may create (or activate) an execution service 141a in a specific app (e.g., a first app 141 of FIG. 2) corresponding to the intention of the utterance of the user based on the path rule. The execution manager module 153 may deliver a first unit operation (e.g., the first unit operation on sequential arrangements) of at least one unit operation (or at least one state) included in a series of sequential arrangements in the path rule to the execution service 141a. In operation 9, the execution service 141a may search the app 141 for a suitable function corresponding to the first unit operation, and may process the first unit operation by performing the function based on parameter information corresponding to the first unit operation. In operation 10, the execution service 141a may deliver completion information on performance of the first unit operation to the execution manager module 153.

According to an embodiment of the disclosure, the execution manager module 153 may deliver a second unit operation sequentially arranged after the first unit operation in the path rule to the execution service 141a in response to the reception of the completion information on the first unit operation. The execution service 141a may process a second unit operation similarly to those mentioned above through operations 9 and 10 to deliver the completion information to the execution manager module 153. In an embodiment, the execution manager module 153 and the execution service 141a may repeat the processes that are similar to operations 8 to 10 for at least one unit operation including parameter information.

According to an embodiment of the disclosure, in operation 11, the execution service 141a may search for a function for a specific unit operation delivered from the execution manager module 153, and may identify that parameter information corresponding to the performance of the specific unit operation is omitted at a time point at which the function is to be performed. Further, in various embodiments, the execution service 141a may identify a validity of parameter information included in the specific unit operation (e.g., whether the parameter information is parameter information that is suitable for performing the specific unit operation). The execution service 141a may determine that the parameter related to performance of the corresponding operation is omitted from the specific unit operation (or determine that the parameter information is not valid), the execution manager module 153 may provide determination information as in operation 12, and the execution manager module 153 may deliver the provided determination information to the intelligence agent 151.

According to an embodiment of the disclosure, in operation 13, as the intelligence agent 151 determines that parameter information is omitted from the specific unit operation (or determines that the parameter information is not valid), the intelligence agent 151 may request creation of a feedback from the NLG module 250 (see FIG. 4) of the intelligence server 200. In an embodiment, the feedback may be contents (e.g., a message) in the form of a text that requests an additional information input to allow the user to recognize insufficiency of an utterance to allow the user to provide parameter information that is necessary for performing of the specific unit operation. In operation 14, the natural language creating module 150 may create the feedback to transmit the feedback to the intelligence agent 151.

Figure 8C:
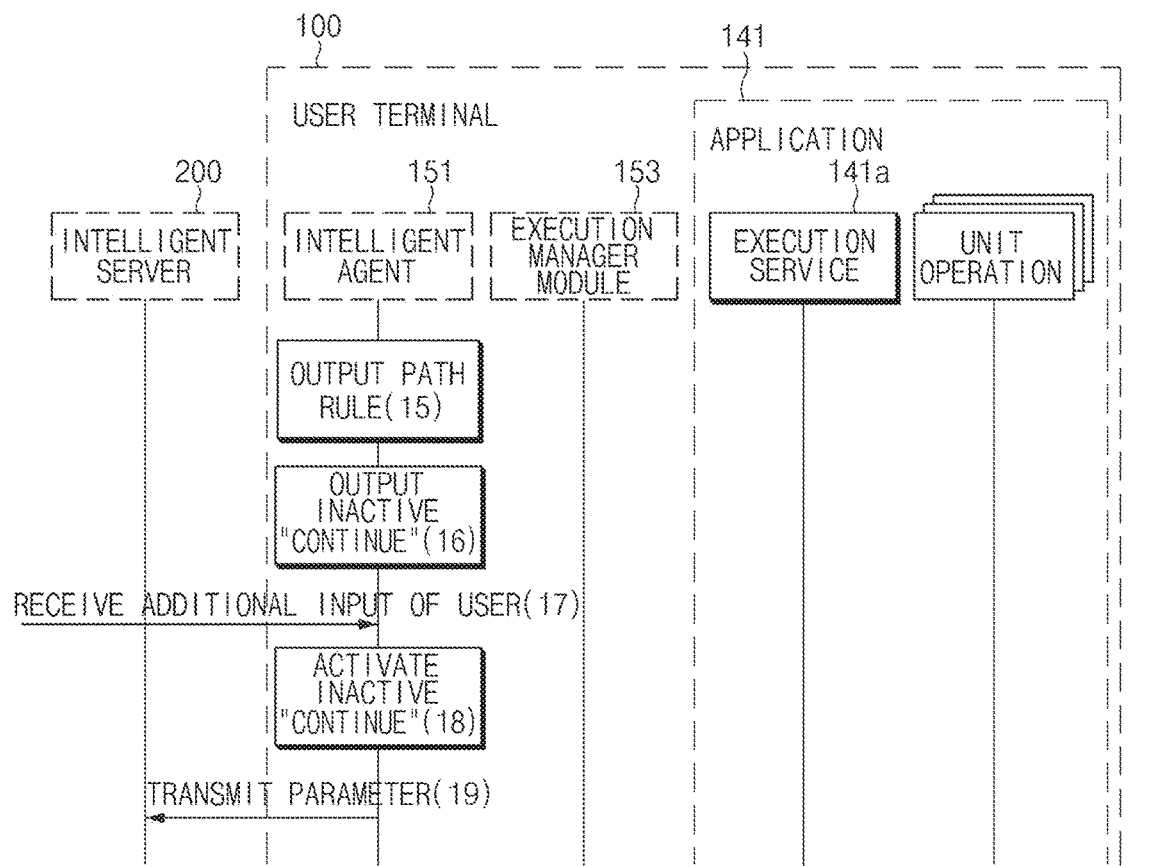
FIG. 8C is a view illustrating a third signal flow between an element of a user terminal and an intelligent server and related fourth to sixth interfaces according to an embodiment of the disclosure.
Figure 8C:
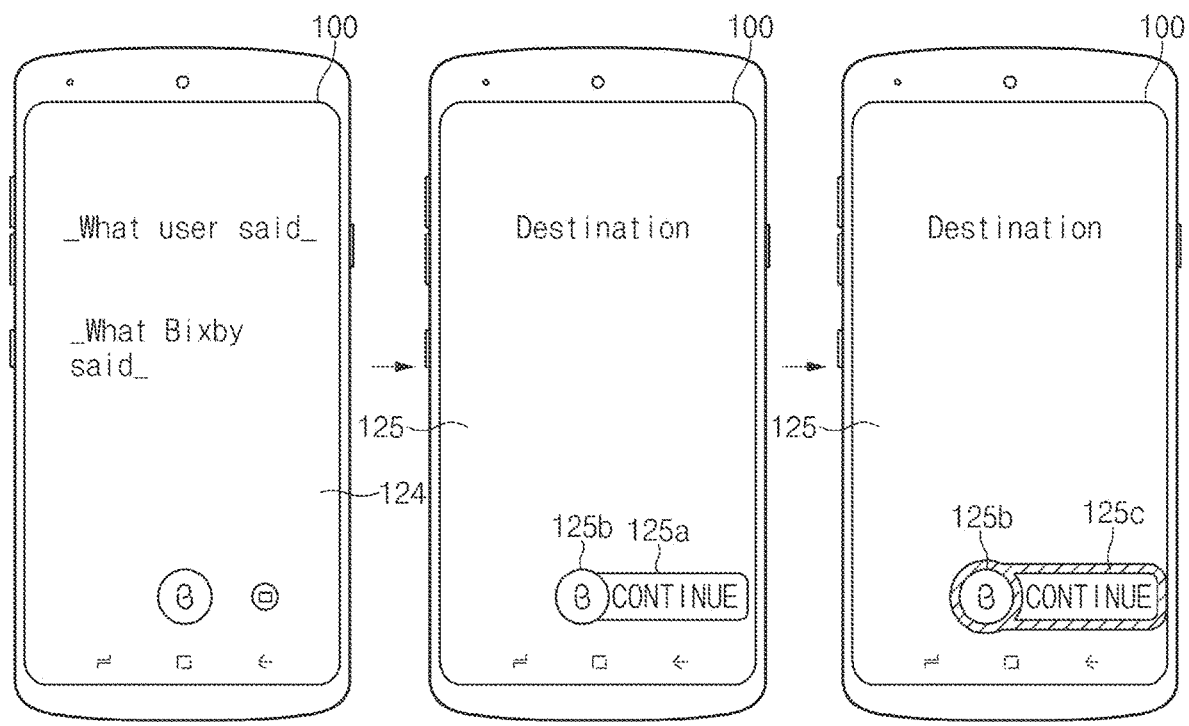

Referring to FIG. 8C, in operation 15, the intelligence agent 151 may output the feedback transmitted from the NLG module 250. For example, the intelligence agent 151 may request an additional information input from the user by outputting a fourth interface 124 including the feedback in a screen area of the display 120. In FIG. 8C, the feedback (e.g., a Bixby's feedback) illustrated in the fourth interface 124 is exemplary, and a text corresponding to the omitted parameter information may be displayed in the fourth interface 124. In an embodiment, the above-mentioned first to fourth interfaces 121 to 124 may understood as a dialog interface that supports an interaction (e.g., a conversation) between the intelligence agent 151 (or an artificial intelligent assistant (e.g., Bixby) activated according to execution of the intelligence agent 151) and the user. Further, an area of the screen area of the display 120, except for the dialog interface, may be displayed as a result screen according to performance of the unit operations.

According to an embodiment of the disclosure, in operation 16, if a specific time elapses from the output of the feedback, a button 125a (or a tap) (e.g., a button including a text, a phrase, a symbol, or a letter, hereinafter referred to as a button including NEXT or CONTINUE) of a first form may be output when the feedback is extinguished. The button 125a of the first form, for example, may be output to at least partially overlap a specific icon 125b (e.g., a Bixby icon or B) According an embodiment, the first form, for example, may include process of black and white and non-flickering as a display effect that represents deactivation of a button. In an embodiment, the button 125a of the first form may be displayed in the fifth interface 125, and the fifth interface 125 may a performance result screen for a unit operation before a specific unit operation of the at least one unit operation, in which the parameter information is determined to be omitted.

According to an embodiment of the disclosure, in operation 17, the user may recognize that the initial utterance is insufficient according to the feedback or the button output 125a of the first form, and may input additional information corresponding to the feedback. For example, the user may input the additional information through an additional utterance or a touch input (e.g., a software input panel (SIP), a keyboard touch, or a specific content touch), and the intelligence agent 151 may receive an additional input of the user. In an embodiment, in the case of the additional utterance, the additional utterance may be performed through an operation of long-pressing a hardware key (e.g., 112 of FIG. 3) or the specific icon 125b (e.g., B) of the user terminal 100. In operation 18, the intelligence agent 151 may convert the button 125a of the first form displayed in the fifth interface 125 to a button 125c of a second form in response to the reception of the additional input. For example, the intelligence agent 151 may convert a button at a time point of initiation of the additional utterance or touch input of the user. Further, the intelligence agent 151 may convert the button at a time point at which the additional utterance or touch input is received, after lapse of a specific time from the initiation of the additional utterance or touch input, or a time point at which the additional utterance or touch input is completed. The second form is an aspect in which the button 125a of the first form is activated, and for example, may include coloring or flickering. In an embodiment, the button 125c of the second form of an activated aspect may function as a notification that represents that an additional input of the user is performed. In operation 19, the intelligence agent 151 may transmit parameter information according to the additional information input of the user to the intelligence server 200. For example, when the user selects the button 125c of the second form, selects an area (e.g., the icon 125b) of the fifth interface 125, or additionally manipulates the hardware key 112, the intelligence agent 151 may transmit the information according to the additional input to the intelligence server 200.

Figure 8D:
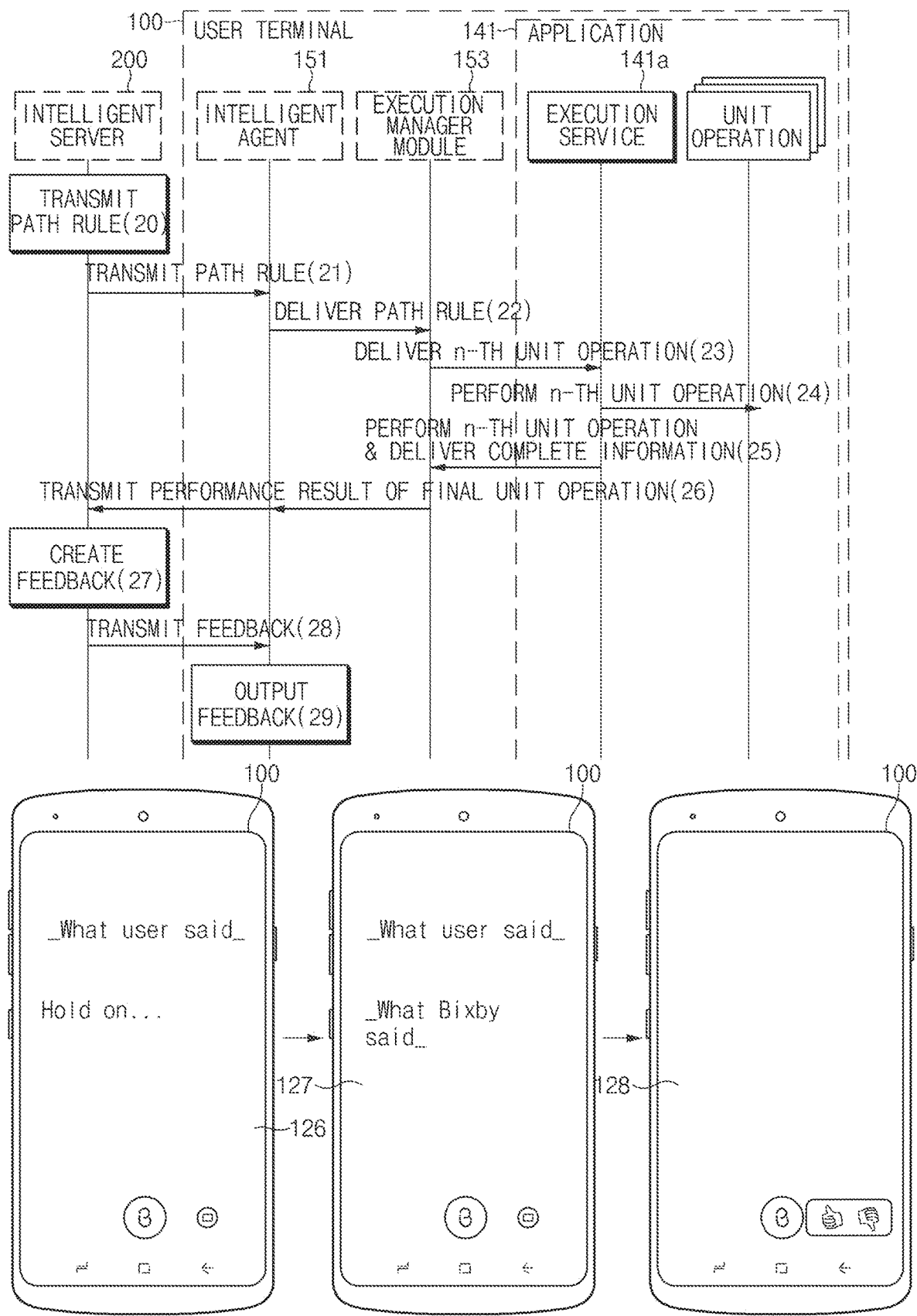
FIG. 8D is a view illustrating a fourth signal flow between an element of a user terminal and an intelligent server and related seventh to ninth interfaces according to an embodiment of the disclosure.

Referring to FIG. 8D, in operation 20, the NLU module 220 of the intelligence server 200 may create a refined path rule by applying (or adding) parameter information provided from the intelligence agent 151 to the path rule created in advance. Then, the intelligence agent 151 may output a sixth interface 126 functioning as a notification for processing of an additional input of the user in the screen area of the display 120. The sixth interface 126, for example, may be an aspect that is the same as or similar to the above-mentioned third interface 123. In operation 21, the NLU module 220 may transmit the refined path rule to the intelligence agent 151, and in operation 22, the intelligence agent 151 may deliver the refined path rule to the execution manager module 153.

According to an embodiment of the disclosure, in operation 23, the execution manager module 153 may identify an n-th operation (e.g., the above-mentioned unit operation) from which parameter information is omitted with reference to the refined path rule, and may deliver the n-th unit operation to the execution service 141a. In operations 24 and 25, the execution service 141a may perform processes that are similar to operations 9 and 10 for the n-th unit operation. For example, the execution service 141a may search the app 141 for a function corresponding to the n-th unit operation, may perform the function based on the parameter information of the additionally applied n-th unit operation, and may deliver completion information on the performance of the n-th unit operation to the execution manager module 153.

In an embodiment of the disclosure, if processes that are similar to operations 23 to 25 are performed on the final unit operation of the sequential arrangements, of the at least one unit operation included in the path rule, in operation 26, the execution manager module 153 may deliver the completion information on the performance of the final operation delivered from the execution service 141a to the intelligence agent 151 and the intelligence agent 151 may transmit the delivered complete information to the intelligence server 200. In operation 27, the NLG module 250 of the intelligence server 200 may create a feedback in the form of a text that guides that performance of at least one unit operation included in the path rule is completed based on the completion information on the performance of the final unit operation, and may transmit the created feedback to the intelligence agent 151 in operation 28. Accordingly, the intelligence agent 151 may output the feedback (e.g., the performance of the task is completed) through the seventh interface 127. In an embodiment, the sixth interface 126 and the seventh interface 127 may be understood as dialog interfaces. The feedback displayed in the seventh interface 127 may be extinguished after lapse of a specific time, and in response, contents (e.g., an icon) that help the user express a satisfaction or a dissatisfaction on the processing of the utterance of the user may be displayed in the eighth interface 128 corresponding to the performance result screen of the final unit operation.

Figure 9A:
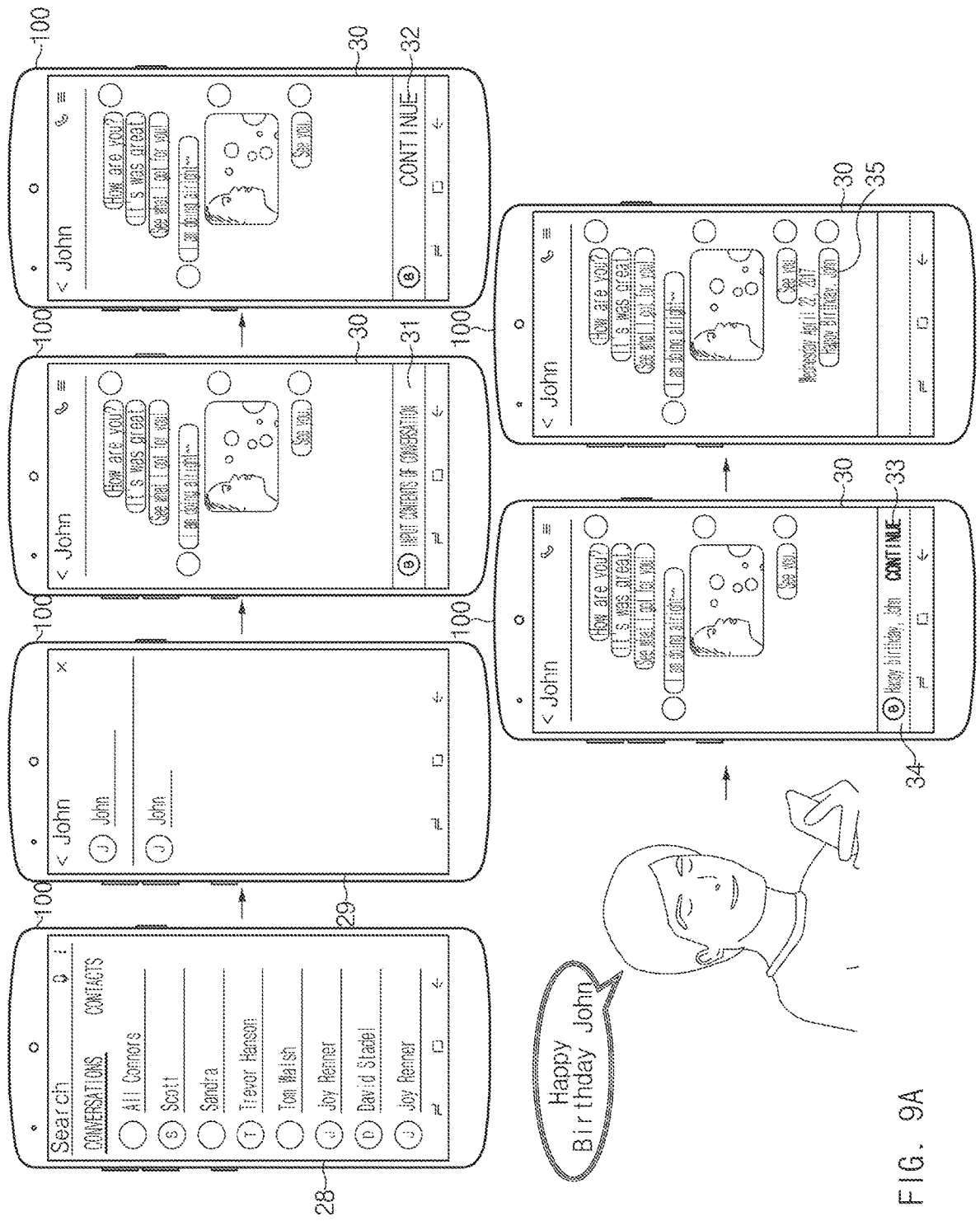
FIG. 9A is a view illustrating an additional user input of a first form according to an embodiment of the disclosure.
Figure 9B:
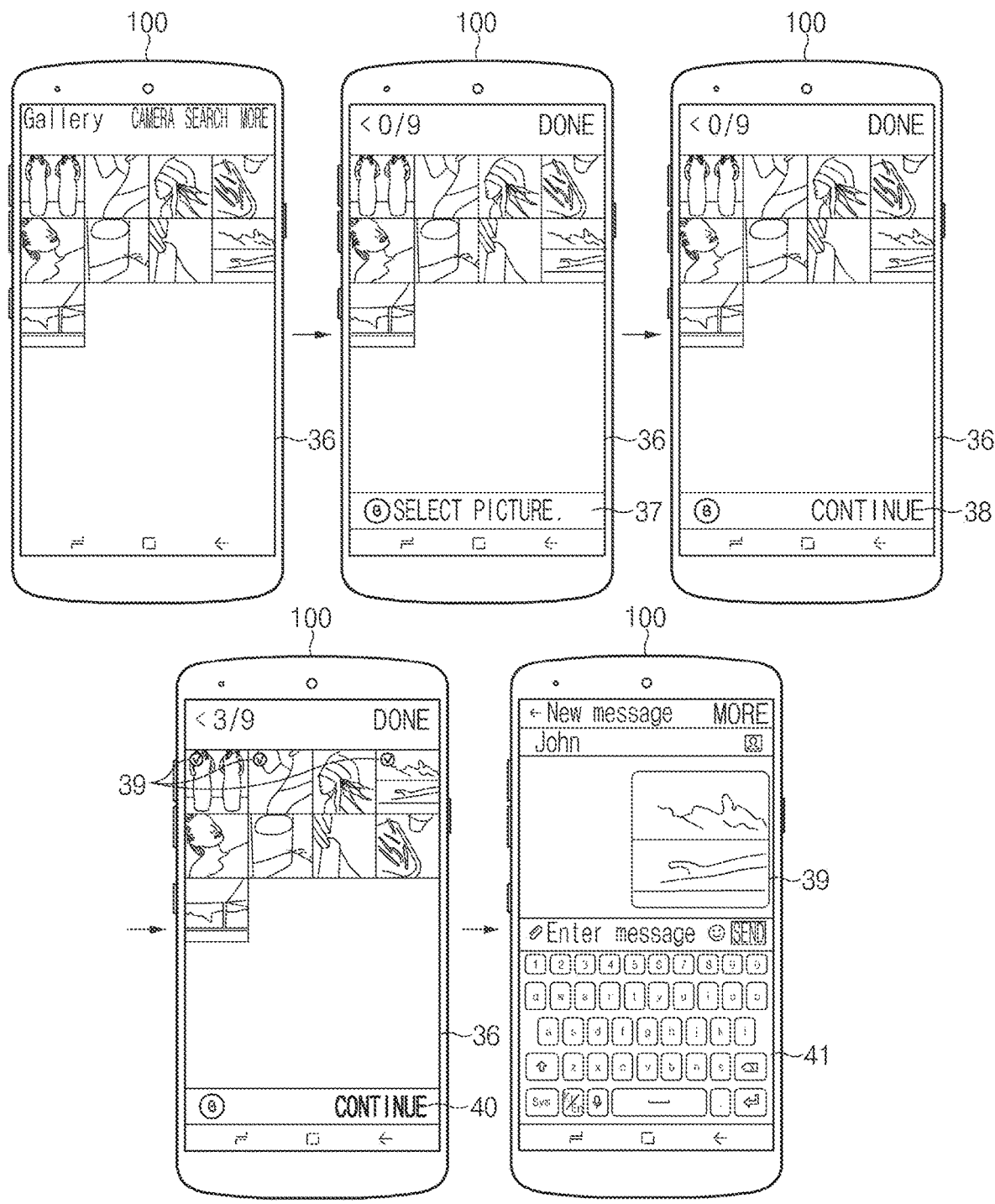
FIG. 9B is a view illustrating an additional user input of a second form according to an embodiment of the disclosure.
Figure 9C:
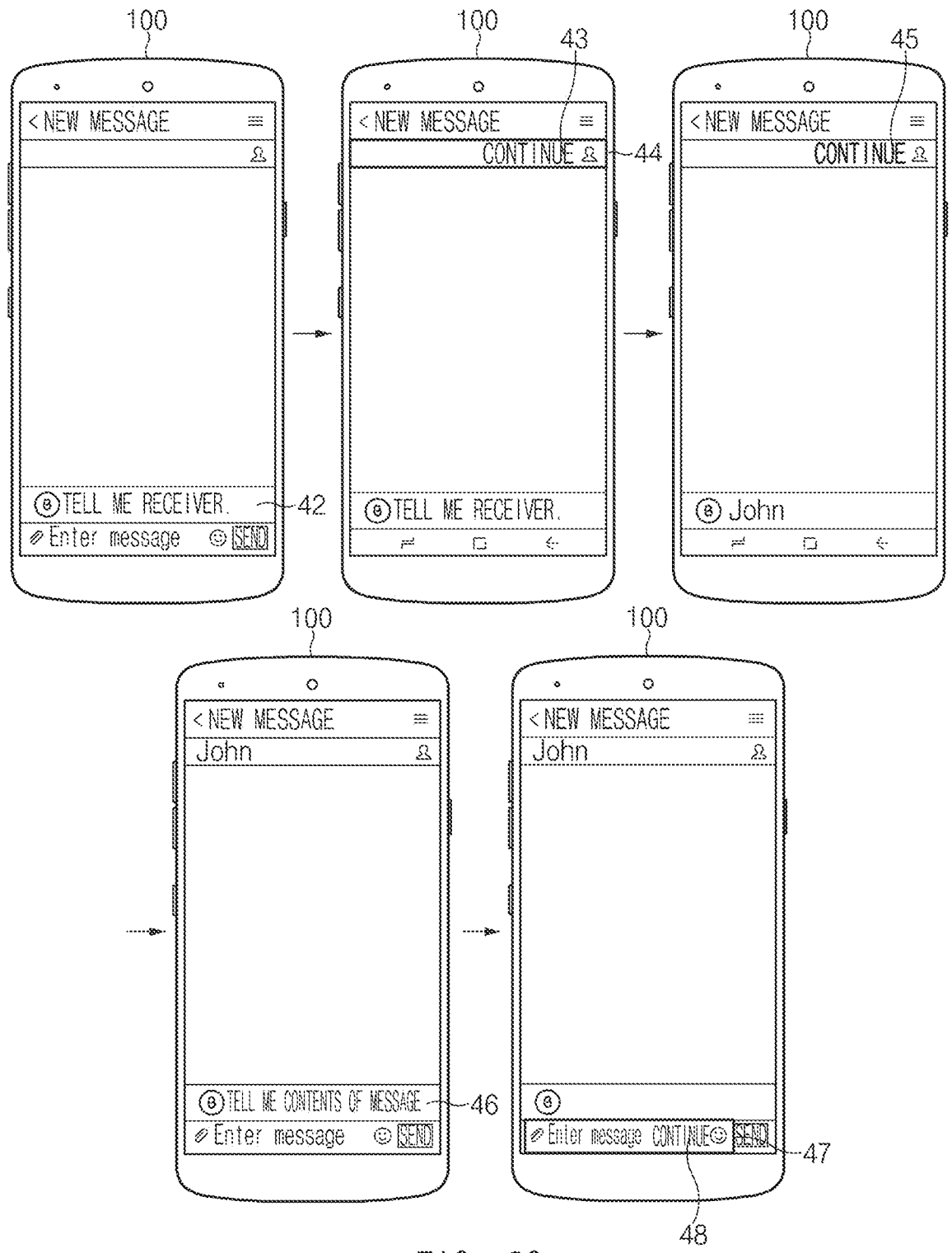
FIG. 9C is a view illustrating an additional user input of a third form according to an embodiment of the disclosure.

FIGS. 9A to 9C are views illustrating additional user inputs of various forms according to various embodiments of the disclosure. Referring to FIGS. 9A to 9C, the repeated description may be omitted or mentioned relatively briefly.

Referring to FIG. 9A, in an embodiment of the disclosure, the user may perform an additional information input based on an additional utterance to support processing of the user terminal 100 for the path rule created incompletely.

In this regard, according to an embodiment of the disclosure, according to an utterance (e.g., "Send John a message") of the user, the intelligence agent 151 (see FIG. 2) may receive a user input and transmit the user input to an intelligence server 200 (see FIG. 4), and may receive a path rule (or a sequence) corresponding to the utterance from the NLU module 220 (see FIG. 4) of the intelligence server 200. The path rule may be delivered to the execution manager module 153 (see FIG. 2) from the intelligence agent 151, and a first unit operation (e.g., a message app executing operation) (or a state) may be delivered to the execution service in an app (e.g., a message app) corresponding to the intention of the utterance of the user by the execution manager module 153. The execution service may perform the first unit operation based on the parameter information corresponding to the first unit operation, and accordingly, a result screen 28 (e.g., a message app start screen) of the performance of the first unit operation may be output in the screen area of the display 120 (see FIG. 2) of the user terminal 100.

According to an embodiment of the disclosure, the execution service may deliver completion information of the performance of the first unit operation to the execution manager module 153, and may receive a second unit operation (e.g., a message receive searching operation) sequentially arranged after the first unit operation from the execution manager module 153. When the second unit operation is performed by the execution service, a result screen 29 (e.g., a John searching screen) of the performance of the second unit operation may be output in the screen area of the display 120. Thereafter, the execution manager module 153 may deliver a third unit operation (e.g., an operation of starting a message interface with John) to an execution service based on information on completion of the performance of the second unit operation delivered from the execution service. According to the performance of the third unit operation of the execution service, a result screen 30 (e.g., a screen for a message interface with John) of the performance of the third unit operation may be output in the screen area of the display 120.

According to an embodiment of the disclosure, the execution service may identify omission of parameter information (e.g., contents of a message) that is necessary for performing the fourth unit operation at a time point at which the state is transited to a state in which the fourth unit operation (e.g., a message content inputting operation) delivered from the execution manager module 153 may be performed, and accordingly, the NLG module 250 (see FIG. 4) of the intelligence server 200 may create a feedback that requests an additional information input of the user. The intelligence agent 151 may receive the feedback and display 31 (e.g., Input contents of a conversation) a feedback in an area (e.g., a dialog interface area) of the result screen 30 of the performance of the third unit operation.

In an embodiment of the disclosure, if a specific time elapses from the display 31 of the feedback, a button 32 (e.g., an inactive NEXT or an inactive CONTINUE) of the first form may be displayed when the feedback is extinguished. The user may recognize insufficiency of an initial utterance (e.g., "Send John a message") as the display 31 of the feedback or the display of the button 32 of the first form according to the display, and may input additional information corresponding to the display 31 of the feedback by performing an additional utterance (e.g., "Happy Birthday John"). In this case, the intelligence agent 151 may convert the button 32 of the first form to a button 33 (e.g., active NEXT or active CONTINUE) of a second form at a time point (or after lapse of a specific time from initiation of an additional utterance or a time point of completion of an additional utterance) of initiation of an additional utterance of the user. In an embodiment, the user may perform an operation of long-pressing a hardware key (e.g., 112 of FIG. 3) of the user terminal 100 or a specific area (e.g., icon B 125b (see FIG. 8C)) of the dialog interface to perform an additional utterance, and in this case, the microphone 111 (see FIG. 2) of the user terminal 100 may be driven. Further, the microphone 111 may be always on during the activation period of the intelligence agent 151. In an embodiment, when the additional utterance of the user is ambiguous or insufficient (or the requested parameter information is not included in the additional utterance), the intelligence agent 151 may perform the display 31 (e.g., Input contents of a conversation) of the feedback again. In an embodiment, when the button 33 of the second form or a specific icon (e.g., 125b of FIG. 8C) is selected by the user or an additional manipulation is applied to a hardware key (e.g., 112 of FIG. 3) of the user terminal, the intelligence agent 151 may deliver a user input according to the additional utterance to the intelligence server 200.

According to an embodiment of the disclosure, the NLU module 220 of the intelligence server 200 may create a refined path rule by applying (or adding) parameter information according to an additional user input transmitted from the intelligence agent 151 to the path rule created in advance. The refined path rule is transmitted to the intelligence agent 151, and the execution manager module 153 may receive the refined path rule from the intelligence agent 151 and identify a fourth unit operation (e.g., a message content inputting operation) from which parameter information has been omitted. The execution manager module 153 may deliver the identified fourth unit operation to an execution service of an app, and contents of a message may be displayed 34 in an area (e.g., the dialog interface area) of the result screen 30 (e.g., a screen of a message interface with John) of the performance of the third unit operation according to the performance of the fourth unit operation of the execution service.

According to an embodiment of the disclosure, the execution manager module 153 may receive information on the completion of the performance of the fourth unit operation from the execution service, and may deliver a fifth unit operation (e.g., a message content transmitting operation) corresponding to the final unit operation after the fourth unit operation to the execution service. According to the performance of the fifth unit operation of the execution service, the execution manager module 153 may receive information on completion of the performance of the fifth operation and transmission of a message may be displayed 35 in the result screen 30 of the performance of the third unit operation. The information on the completion of the performance of the fifth unit operation may be transmitted to the NLG module 250 of the intelligence server 200 so that a feedback of a text form that guides that the performance of the final unit operation (e.g., the fifth unit operation) included in the path rule is completed, and the feedback may be transmitted to the intelligence agent 151 and be output (not illustrated).

Referring to FIG. 9B, in an embodiment of the disclosure, the user may perform an additional information input based on a touch input (e.g., a software input panel (SIP) keyboard touch). A process of refining a path rule created in advance according an additional information input of the user may be similar to or correspond to the one described with reference to FIG. 9A, and a touch input of the user may be mainly described with reference to FIG. 9B.

According to an embodiment of the disclosure, based on a path rule (or a sequence) created according to a utterance (e.g., "Send John a picture") of the user, an execution service in an app (e.g., a gallery app) corresponding to the utterance may perform at least one unit operation (or state). According to the performance of the first unit operation (e.g., a gallery app executing operation) of the execution service, a result screen 36 (e.g., a gallery app starting screen) of the performance of the first unit operation may be output in the screen area of the display 120. Thereafter, the execution service may identify omission of parameter information corresponding to the second unit operation (e.g., a picture selecting operation), and accordingly, a feedback 37 (e.g., Select a picture) created by the NLG module 250 of the intelligence server 200 may be displayed in the result screen 36 of the performance of the first unit operation. If a specific time elapses from the display of the feedback 37 and the feedback 37 is extinguished and a button 38 (e.g., inactive NEXT or inactive CONTINUE) of the first form is output, at least one picture 39 that is to be transmitted may be touched (or selected) on the result screen 36 of the performance of the first unit operation by using at least a part (e.g., a finger) of the body of the user. The button 38 of the first form may be converted to a button 40 (e.g., active NEXT or active CONTINUE) of the second form at a time point at which the touch input of the user is initiated. When the touch input is completed, the user may express that an additional information input is completed by touching the button 40 of the second form. In this case, the intelligence agent 151 may transmit parameter information (e.g., selected picture information) according to an additional information input of the user to the NLU module 220 of the intelligence server 200, and may receive a refined path rule from the NLU module 220. The execution manager module 153 may identify a second unit operation from which parameter information has been omitted in the refined path rule, and the second unit operation may be delivered to an execution service to be performed. In an embodiment, in relation to the performance of at least one unit operation (e.g., a picture attaching operation or a picture transmitting operation) after the second unit operation, a related feedback (e.g., Select an app to which a picture will be sent (not illustrated)) may be further output in the screen area of the display 120, and the user may provide parameter information (e.g., selected app information) through an additional input. Based on this, the execution manager module may deliver a unit operation after the second unit operation to an app (e.g., a message app) that is separated from apps corresponding to the first unit operation and the second unit operation. An execution service in the separate app completely performs the final unit operation (e.g., a picture transmitting operation), a result screen 41 of the performance of the final unit operation, to which the at least one picture 39 is attached, may be output in the screen area of the display 120.

Referring to FIG. 9C, the display of the button (e.g., inactive NEXT or inactive CONTINUE) of the first form or the button (e.g., active NEXT or active CONTINUE) of the second form is not limited to the dialog interface area, but may be displayed in an area corresponding to parameter information that is to be acquired from an additional information input of the user.

In an embodiment of the disclosure, an execution service in a specific app corresponding to the utterance of the user may determine omission of the parameter information for a specific unit operation (or determine that the parameter information included in the specific unit operation is not valid). The determination information may be delivered to the NLG module 250 of the intelligent server via the execution manager module 153 and the intelligence agent 151. The NLG module 250 may create a text feedback that requests the user to perform an additional information input (or provide an additional parameter) based on the delivered determination information. The feedback may be delivered to the intelligence agent 151 and be displayed 42 on the display 120.

In an embodiment of the disclosure, when a specific time elapses from the display of the feedback, the intelligence agent 151 may be extinguished the display of the feedback and display the button 43 of the first form. In this regard, the intelligence agent 151 may determine an attribute of the omitted parameter information (or the kind of parameter information that is to be obtained from an additional information input of the user) for the specific unit operation based on the determination information delivered from the execution service. The intelligence agent 151 may determine a display area of the button 43 of the first form as an area corresponding to the determined attribute of the parameter information. For example, when the attribute of the parameter information is determined as a message receiver, the intelligence agent 151 may display the button 43 of the first form in a menu area 44 in which the message receiver may be designated or selected from an app (e.g., a message app) to which at least one unit operation (or a state) according to a path rule (or a sequence) is applied or in an adjacent area thereof. Accordingly, the user may explicitly recognize additionally requested information.

According to an embodiment of the disclosure, at a time point at which an additional information input of the user is initiated (or after lapse of a specific time from the initiation or at a time point at which the additional information input is completed), the button 43 of the first form, for example, may be converted to a button 45 of the second form which is endowed with a display effect (e.g., coloring or flickering), and the additionally input information (or parameter information) may delivered to the intelligence server 200 and be applied to refinement of a path rule. The refined path rule may be delivered to the user terminal 100 and a unit operation after the specific unit operation may be performed. Then, if it is determined that corresponding parameter information is omitted again when the unit operation after the specific unit operation is performed, a feedback may be displayed 46 similarly to the one described above. In an embodiment, the intelligence agent 151 may determine an attribute (e.g., contents of a message) of the requested parameter information to display a button 48 of the first form in a corresponding area 47 (e.g., a text input area). In this way, when a plurality of pieces of parameter information are to be additionally obtained from the user, feedbacks and buttons of the first form corresponding to the pieces of parameter information may be sequentially provided based on the sequential arrangements of the unit operations that constitute a path rule.

In various embodiments of the disclosure, the button of the first form or the button (e.g., a GUI) of the second form may include, although not illustrated, sensitive information (e.g., private information or financial information) in addition to the one output in response to the omission of the parameter information for the specific unit operation or may be output when a unit operation that requires a caution of the user or an approval is performed. In this case, the following unit operations may be performed when a touch input of the user is applied to the GUI.

Figure 10A:
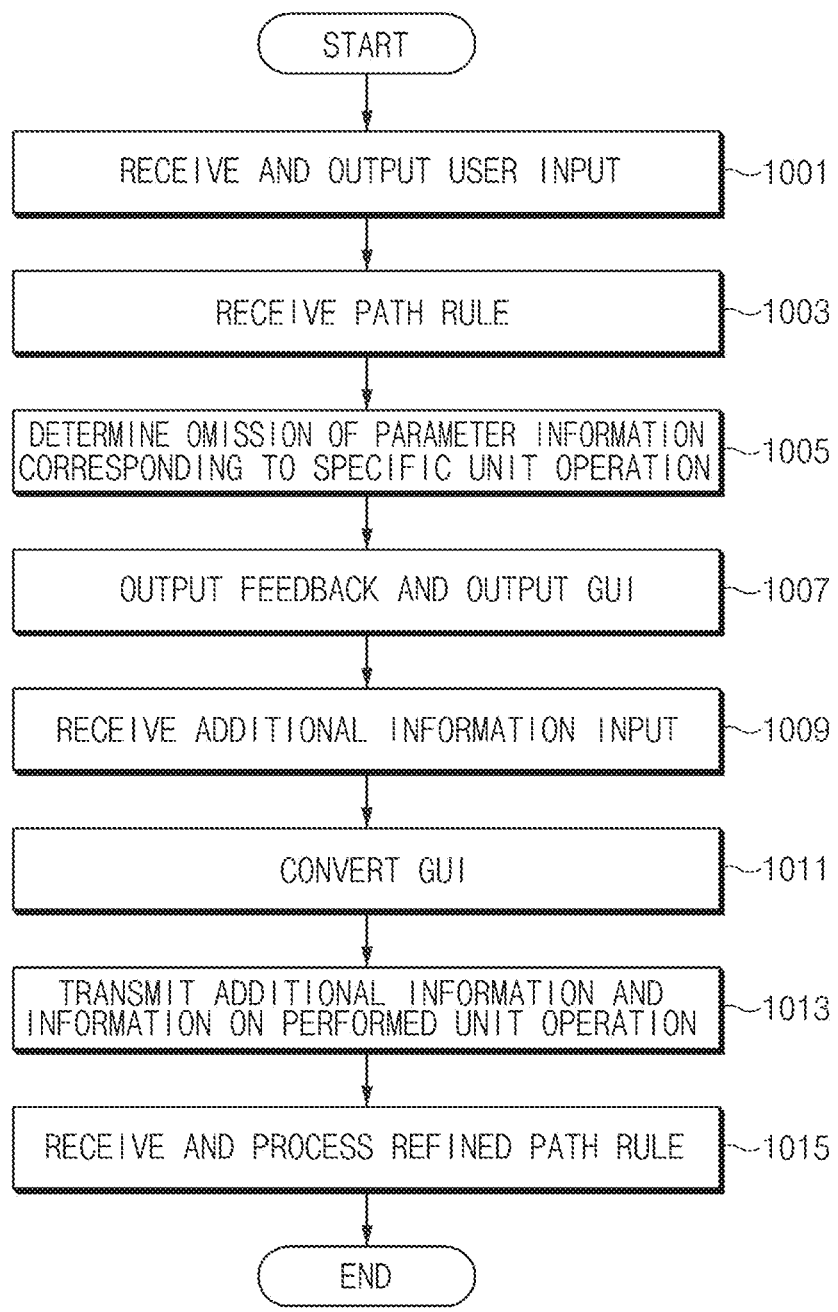
FIG. 10A is a view illustrating an example of operating a speech recognition service of a user terminal according to an embodiment of the disclosure.

FIG. 10A is a view illustrating an example of operating a speech recognition service of a user terminal according to an embodiment of the disclosure.

Referring to FIG. 10A, in operation 1001, the user terminal (e.g., 100 of FIG. 2) may receive a user input by an utterance of the user including an intention or a command related to performance (e.g., transmission of a message or reproduction of music) of a specific function (or a task) of the user terminal 100. For example, the intelligence agent 151 (see FIG. 2) of the user terminal 100 may transmit the received user input to the ASR module 210 (see FIG. 4) of the intelligence server 200 (see FIG. 4). The ASR module 210 may convert the data to text data by performing recognition of the user input, and the text data may be provided to the user terminal 100 again to be output on the display 120 (see FIG. 2).

According to an embodiment of the disclosure, in operation 1003, the user terminal 100 may receive a path rule from the intelligence server 200. For example, the NLU module 220 (see FIG. 4) of the intelligence server 200 may determine an intention of an utterance of the user for the user input based on a specific matching rule, and may create a path rule (or a sequence) including at least one unit operation (or a state) that is to be performed by the user terminal 100 based on the intention of the utterance. The at least one unit operation may include parameter information that is necessary for performing the operation. The NLU module 220 may transmit the created path rule to the intelligence agent 151 of the user terminal 100.

According to an embodiment of the disclosure, in operation 1005, the user terminal 100 may identify that parameter information on a specific unit operation is omitted or not valid. For example, the intelligence agent 151 may deliver the path rule to the execution manager module 153 (see FIG. 2), and the execution manager module 153 may create an execution service 141a or 143a (see FIG. 2) in a specific app corresponding to the path rule. The execution manager module 153 may deliver a first unit operation (e.g., the first unit operation on sequential arrangements) of at least one unit operation included in a series of sequential arrangements in the path rule to the execution service. The execution service may perform a first unit operation. In an embodiment, the execution service may identify and determine that parameter information on a specific unit operation is omitted or not valid.

According to an embodiment of the disclosure, in operation 1007, the user terminal 100 may request creation of a feedback from the intelligence server 200. For example, the intelligence agent 151 may receive determination information from the execution manager module 153, and may request creation of a feedback that requests an additional information input of the user from the NLG module 250 (see FIG. 4) of the intelligence server 200. The feedback created by the NLG module 250 may be transmitted to the intelligence agent 151 and may be output on a result screen for a unit operation before the specific unit operation. In an embodiment, when a specific time elapses from the output or display of the feedback, the feedback may be extinguished and a first GUI may be output. The first GUI, for example, may be an object or a tap including a specific text, a phrase, a symbol, or a letter, and may be displayed in an area corresponding to an attribute of parameter information that is necessary for performing the specific unit operation. Further, the first GUI is an inactive state, and may include a first display effect (e.g., processing of black and white or non-flickering) that represents the inactive state.

According to an embodiment of the disclosure, in operation 1009, the user terminal 100 may receive an additional information input from the user. For example, the intelligence agent 151 of the user terminal 100 may receive an additional information (e.g., parameter information) input performed by the user who recognized insufficiency of an initial utterance according to the feedback or the first GUI.

According to an embodiment of the disclosure, in operation 1011, the user terminal 100 may convert the first GUI in response to the additional information input. For example, the intelligence agent 151 may convert the first GUI to a second GUI at a time point at which the additional information input is received (or after lapse of a specific time from the additional information input or at a time point at which additional information input is completed). The second GUI is an active state, and for example, may include a display effect, such as coloring or flickering. When an utterance of the user for an additional information input is completed (or when an ending point of the utterance is detected), the second GUI may be extinguished. Further, when the user applies a touch to the second GUI, the second GUI may be extinguished.

According to an embodiment of the disclosure, in operation 1013, the user terminal 100 may transmit an additional information input of the user to the intelligence server 200. For example, the intelligence agent 151 of the user terminal 100 may transmit the received additional information input and the information on the path rule (e.g., information on the unit operation of the at least one unit operation included in the path rule, which has been completely performed) to the NLU module 220 of the intelligence server 200. Accordingly, the NLU module 220 may refine the path rule by applying (or adding) the transmitted additional information to the path rule created in advance. Further, in various embodiments, the NLU module 220 may create a new path rule from which the existing path rule is excluded and to which the additional information is applied.

According to an embodiment of the disclosure, in operation 1015, the user terminal 100 may receive the refined path rule from the intelligence server 200. For example, the intelligence agent 151 may receive the refined path rule from the NLU module 220 and deliver the refined path rule to the execution manager module 153. The execution manager module 153 may determine whether at least one unit operation performed already is included in the refined path rule, and may identify the specific unit operation from which parameter information has been omitted. The execution manager module 153 may deliver the identified specific unit operation to an execution service in an app, and the execution service may perform the specific unit operation.

Figure 10B:
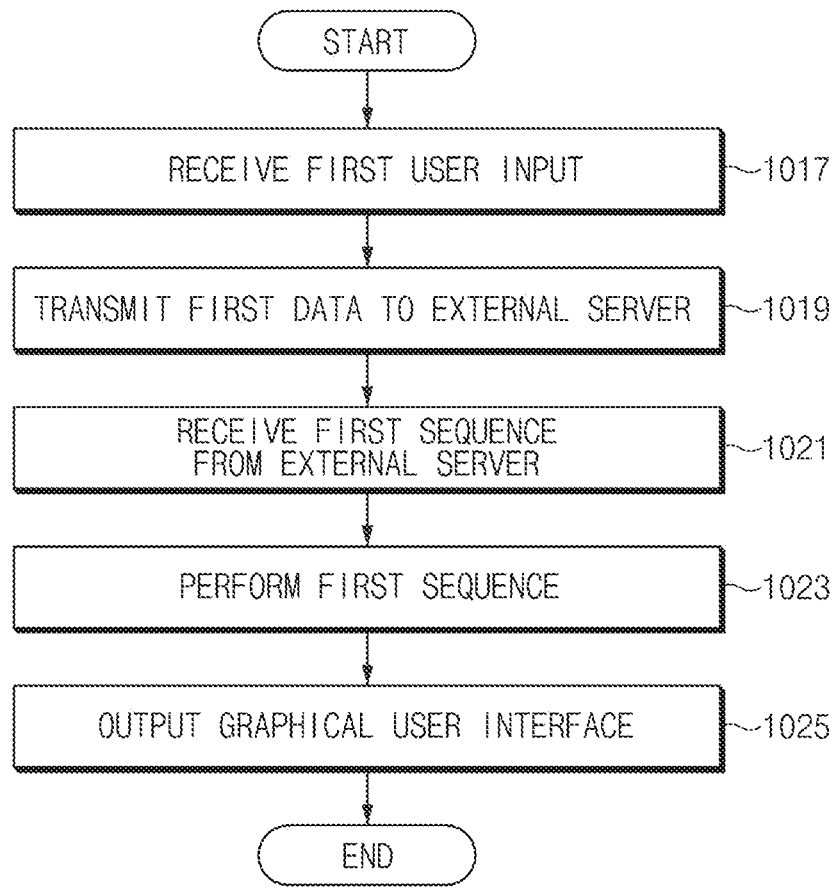
FIG. 10B is a view illustrating a method of operating a speech recognition service of a user terminal according to an embodiment of the disclosure.

FIG. 10B is a view illustrating a method of operating a speech recognition service of a user terminal according to an embodiment of the disclosure.

Referring to FIG. 10B, in operation 1017, the user terminal 100 (see FIG. 2) may receive a first user input. For example, after the intelligence agent 151 (see FIG. 2) is activated according to a control of the user (e.g., manipulation of a hardware key (e.g., 112 of FIG. 3) of the user terminal or performance of an utterance of a specific wakeup command), the processor 150 (see FIG. 2) (or the intelligence agent 151 (see FIG. 2)) of the user terminal may receive a first user input including a request for performing a first task (e.g., execution and control of a specific app) of the user terminal.

In an embodiment, the first user input may be an input that does not include all of the at least one parameter that is necessary for performing the first task. For example, the first user input may be a user input from which all of the at least one parameter that is necessary for performing the first task are omitted or all of information for a specific parameter of the at least one parameter are omitted.

According to an embodiment of the disclosure, in operation 1019, the user terminal may transmit first data for the first user input to an external server. For example, the processor of the user terminal may transmit first data related to the first user input to the external server (e.g., the intelligence server 200 (see FIG. 1)) including an intelligent system (e.g., an integrated intelligent system 10 (see FIG. 1)) through the communication circuit 160 (see FIG. 2).

According to an embodiment of the disclosure, in operation 1021, the user terminal may receive a first sequence from the external server. In an embodiment, the first sequence may include at least one user terminal state for performing the first task in the user terminal.

According to an embodiment of the disclosure, in operation 1023, the user terminal may perform the first sequence. For example, the processor of the user terminal may perform some of the at least one user terminal states included in the first sequence, and may output a screen related to the performed some states on the display 120 (see FIG. 2).

According to an embodiment of the disclosure, in operation 1025, the user terminal may output a specific GUI in an area of the display. For example, after performing some of the at least one user terminal states, the processor of the user terminal may output a GUI that represents a request of provision of at least one parameter, which has been omitted from the first user input. In an embodiment, the omitted at least one parameter may be necessary for performing a first task of the user terminal.

An electronic device according to various embodiments includes a housing, a display exposed through at least a portion of the housing, a microphone, a speaker, a communication circuit, a processor electrically connected to the display, the microphone, the speaker, and the communication circuit, and a memory electrically connected to the processor.

According to various embodiments of the disclosure, the memory may be configured to store at least one application.

According to various embodiments of the disclosure, the processor, upon execution of instructions of the at least one application program, may be configured to receive a first user input including a request for performing a first task that requires at least one parameter for execution and not including an entirety of the at least one parameter (e.g., all of the plurality of parameters or all of the parameter information), transmit first data related to the first user input to an external server through the communication circuit, receive a first sequence of states of the electronic device for performing the first task from the external server through the communication circuit, perform not all but some of the first sequence of the states while displaying at least some of states changed in the first sequence through the display, by the electronic device, and after the performing of the some of the first sequence, display a GUI that is required for performing the first task and represents that a user is requested to provide at least one parameter omitted in the first user input in a part of the display.

According to various embodiments of the disclosure, the GUI may comprise at least one of a text or a symbol.

According to various embodiments of the disclosure, the processor may be further configured to before the displaying of the GUI, transmit second data related to a state of the electronic device that is a performance result of the some of the first sequence to the external server through the communication circuit.

According to various embodiments of the disclosure, the second data may comprise an identifier that represents a state of the electronic device.

According to various embodiments of the disclosure, the processor may be further configured to receive a second user input including the omitted parameter through microphone or a user interface on the display, transmit third data related to the second user input to the external server through the communication circuit, and receive a second sequence of states of the electronic device from the external server through the communication circuit.

According to various embodiments of the disclosure, the processor may be further configured to change the GUI according to reception of the second user input.

According to various embodiments of the disclosure, the processor may be further configured to remove the GUI after the second user input is completely received.

According to various embodiments of the disclosure, the processor may be further configured to determine whether the second sequence of the states comprises some of the first sequence of the states that have been already performed for performing the first task, and complete the first task by using the second sequence of the states while not repeating the performed some of the first sequence.

An electronic device according to various embodiments includes a memory configured to store at least one application, a display configured to output an execution screen of the application, a microphone configured to receive a speech signal, a communication circuit configured to perform communication with at least one external device, and a processor electrically connected to the memory, the display, the microphone, and the communication circuit.

According to various embodiments of the disclosure, the processor may in relation to a request for performance of a task of the electronic device, receive a first user input not including at least some of one or more pieces of parameter information that is necessary for performance of the task and transmit the first user input to a first external device, receive a first sequence including at least one unit operation created based on the first user input in relation to performance of the task of the electronic device from the first external device, output a result screen by performing a first unit operation included in the first sequence, at a time point of performance of a second unit operation that is performed based on first parameter information sequentially included in the first sequence after the first unit operation and not included in the first user input, determine whether the first parameter information of the first user input is omitted, determine an attribute of the first parameter information, and display a specific GUI in an area of the result screen of the first unit operation, which corresponds to an attribute of the first parameter information.

According to various embodiments of the disclosure, the processor may after the displaying of the GUI, receive a second user input including at least one of a speech input or a touch input including the first parameter information.

According to various embodiments of the disclosure, the processor may endow the GUI with a specific effect at a time point of reception of the second user input.

A method for operating a speech recognition service of an electronic device according to various embodiments includes in relation to a command on performance of a task of the electronic device, receiving a first user input not including at least some of one or more pieces of parameter information that is necessary for performance of the task, transmitting the first user input to a first external device, receiving a first sequence including at least one unit operation created based on the first user input in relation to performance of the task of the electronic device from the first external device, at a time point of performance a second unit operation that is performed based on first parameter information sequentially included in the first sequence after a first unit operation and not included in the first user input, determining whether the first parameter information of the first user input is omitted, determining an attribute of the first parameter information, and displaying a specific GUI in an area of a screen of the electronic device, which corresponds to an attribute of the first parameter information.

According to various embodiments of the disclosure, the determining of whether the first parameter information of the first user input is omitted may comprise transmitting at least one of information on a performance result of the first unit operation or information on determination of whether the first parameter information is omitted to the first external device.

According to various embodiments of the disclosure, the method for operating a speech recognition service may further include after the displaying of the GUI, receiving a second user input including the first parameter information and transmitting the second user input to the first external device.

According to various embodiments of the disclosure, the receiving of the second user input and the transmitting of the second input to the first external device may comprise endowing the GUI with a specific effect at a time point of reception of the second user input.

According to various embodiments of the disclosure, the endowing of the GUI with the specific effect may comprise extinguishing the displayed first GUI and displaying a second GUI that is endowed with a specific effect.

According to various embodiments of the disclosure, the method for operating a speech recognition service may further include completing performance of a task of the electronic device by receiving a second sequence, on which the second user input is reflected, from the first external device.

According to various embodiments of the disclosure, the completing of the performance of the task of the electronic device may comprise determining whether the first unit operation of the at least one unit operation included in the second sequence, which has been performed in advance, is included.

According to various embodiments of the disclosure, the displaying of the GUI may comprise displaying a GUI including at least one of a letter, a text, and a symbol.

According to various embodiments of the disclosure, the method for operating a speech recognition service may further include outputting a result screen corresponding to a unit operation of at least one unit operation included in the first sequence, which has been performed.

According to various embodiments of the disclosure, the displaying of the specific GUI may occur at a performance completion time point of the first unit operation.

Figure 11:
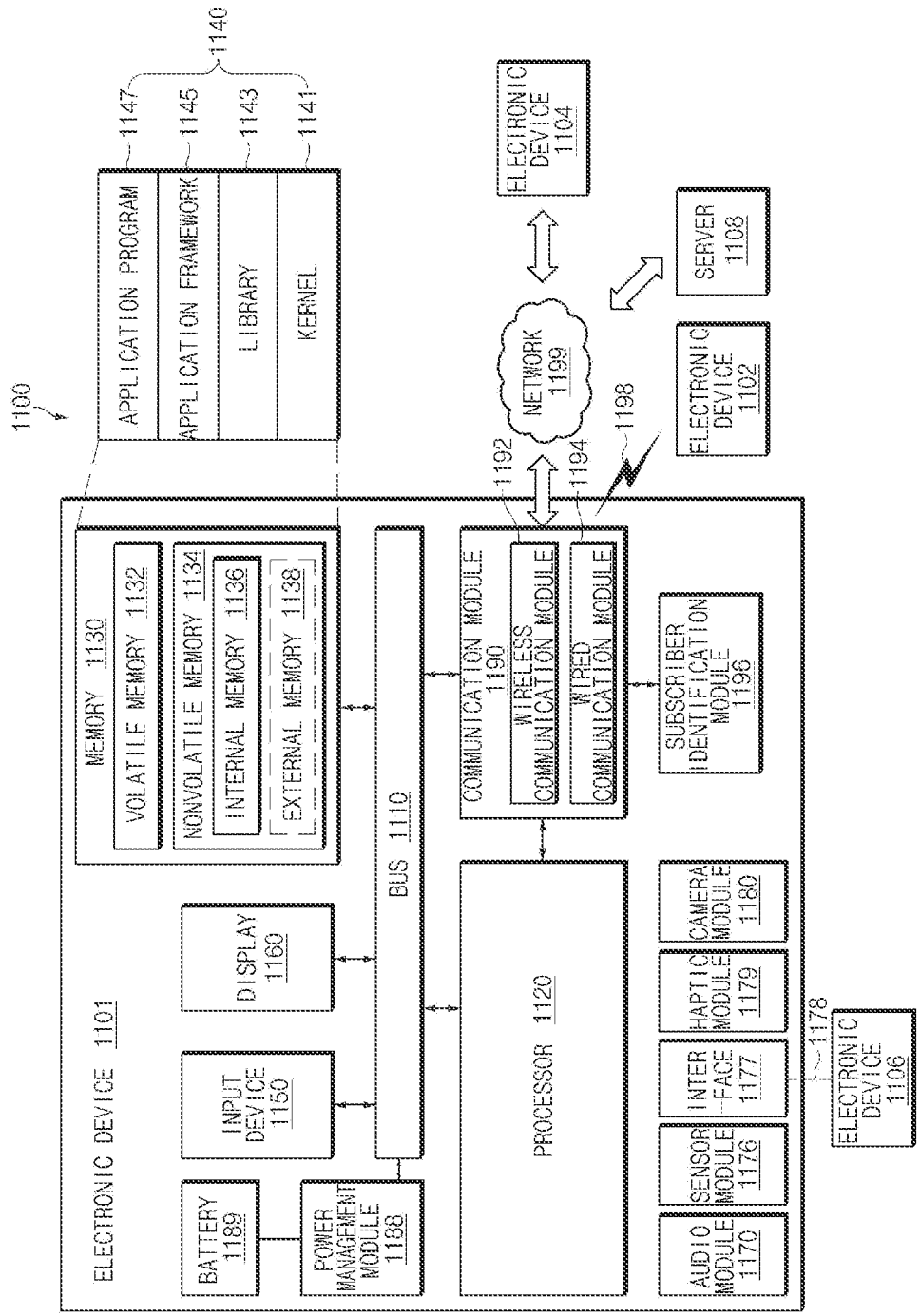
FIG. 11 is a view illustrating an electronic device (or user terminal) in a network environment according to an embodiment of the disclosure.

FIG. 11 is a view illustrating an electronic device (or user terminal) in a network environment according to an embodiment of the disclosure.

Referring to FIG. 11, under the network environment 1100, the electronic device 1101 (e.g., the electronic device 100 of FIG. 2) may communicate with a first external electronic device 1102 through local wireless communication 1198 or may communication with a second external electronic device 1104 or a server 1108 through a network 1199. According to an embodiment, the electronic device 1101 may communicate with the second external electronic device 1104 through the server 1108.

According to an embodiment of the disclosure, the electronic device 1101 may include a bus 1110, a processor 1120, a memory 1130, an input device 1150 (e.g., a micro-phone or a mouse), a display 1160, an audio module 1170, a sensor module 1176, an interface 1177, a haptic module 1179, a camera module 1180, a power management module 1188, a battery 1189, a communication module 1190, and a subscriber identification module 1196. According to an embodiment, the electronic device 1101 may not include at least one (e.g., the display 1160 or the camera module 1180) of the above-described elements or may further include other element(s).

For example, the bus 1110 may interconnect the above-described elements 1120, 1130, 1150, 1160, 1170, 1176, 1177, 1179, 1180, 1188, 1189 and 1190 and may include a circuit for conveying signals (e.g., a control message or data) between the above-described elements. The processor 1120 may include one or more of a CPU, an AP, a graphic processing unit (GPU), an image signal processor (ISP) of a camera or a communication processor (CP). According to an embodiment, the processor 1120 may be implemented with a system on chip (SoC) or a system in package (SiP). For example, the processor 1120 may drive an operating system (OS) or an application to control at least one of another element (e.g., hardware or software element) connected to the processor 1120 and may process and compute various data. The processor 1120 may load a command or data, which is received from at least one of other elements (e.g., the communication module 1190), into a volatile memory 1132 to process the command or data and may store the process result data into a nonvolatile memory 1134.

The memory 1130 may include, for example, the volatile memory 1132 or the nonvolatile memory 1134. The volatile memory 1132 may include, for example, a random access memory (RAM) (e.g., a dynamic RANI (DRAM), a static RAM (SRAM), or a synchronous dynamic RAM (SDRAM)). The nonvolatile memory 1134 may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 1134 may be configured in the form of an internal memory 1136 or the form of an external memory 1138 which is available through connection only if necessary, according to the connection with the electronic device 1101. The external memory 1138 may further include a flash drive such as compact flash (CF), secure digital (SD), micro secure digital (Micro-SD), mini secure digital (Mini-SD), extreme digital (xD), a multimedia card (MMC), or a memory stick. The external memory 1138 may be operatively or physically connected with the electronic device 1101 in a wired manner (e.g., a cable or a universal serial bus (USB)) or a wireless (e.g., Bluetooth) manner.

For example, the memory 1130 may store, for example, at least one different software element, such as an instruction or data associated with the program 1140, of the electronic device 1101. The program 1140 may include, for example, a kernel 1141, a library 1143, an application framework 1145 or an application program (interchangeably, "application") 1147.

The input device 1150 may include a microphone, a mouse, or a keyboard. According to an embodiment, the keyboard may include a keyboard physically connected or a keyboard virtually displayed through the display 1160.

The display 1160 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1101.

The audio module 1170 may convert, for example, from a sound into an electrical signal or from an electrical signal into the sound. According to an embodiment, the audio module 1170 may acquire sound through the input device 1150 (e.g., a microphone) or may output sound through an output device (not illustrated) (e.g., a speaker or a receiver) included in the electronic device 1101, an external electronic device (e.g., the first external electronic device 1102 (e.g., a wireless speaker or a wireless headphone)) or a third external electronic device 1106 (e.g., a wired speaker or a wired headphone) connected with the electronic device 1101

The sensor module 1176 may measure or detect, for example, an internal operating state (e.g., power or temperature) or an external environment state (e.g., an altitude, a humidity, or brightness) of the electronic device 1101 to generate an electrical signal or a data value corresponding to the information of the measured state or the detected state. The sensor module 1176 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1176 may further include a control circuit for controlling at least one or more sensors included therein. According to an embodiment, the sensor module 1176 may be controlled by using the processor 1120 or a processor (e.g., a sensor hub) separate from the processor 1120. In the case that the separate processor (e.g., a sensor hub) is used, while the processor 1120 is in a sleep state, the separate processor may operate without awakening the processor 1120 to control at least a portion of the operation or the state of the sensor module 1176.

According to an embodiment of the disclosure, the interface 1177 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 1178 may physically connect the electronic device 1101 and the third external electronic device 1106. According to an embodiment, the connector 1178 may include, for example, an USB connector, an SD card/MMC connector, or an audio connector (e.g., a headphone connector).

The haptic module 1179 may convert an electrical signal into mechanical stimulation (e.g., vibration or motion) or into electrical stimulation. For example, the haptic module 1179 may apply tactile or kinesthetic stimulation to a user. The haptic module 1179 may include, for example, a motor, a piezoelectric element, or an electric stimulator.

The camera module 1180 may capture, for example, a still image and a moving picture. According to an embodiment, the camera module 1180 may include at least one lens (e.g., a wide-angle lens and a telephoto lens, or a front lens and a rear lens), an image sensor, an image signal processor, or a flash (e.g., a light emitting diode or a xenon lamp).

The power management module 1188, which is to manage the power of the electronic device 1101, may constitute at least a portion of a power management integrated circuit (PMIC).

The battery 1189 may include a primary cell, a secondary cell, or a fuel cell and may be recharged by an external power source to supply power at least one element of the electronic device 1101.

The communication module 1190 may establish a communication channel between the electronic device 1101 and an external device (e.g., the first external electronic device 1102, the second external electronic device 1104, or the server 1108). The communication module 1190 may support wired communication or wireless communication through the established communication channel. According to an embodiment, the communication module 1190 may include a wireless communication module 1192 or a wired communication module 1194. The communication module 1190 may communicate with the external device (e.g., the first external electronic device 1102, the second external electronic device 1104 or the server 1108) through a first network 1198 (e.g. a wireless local area network such as Bluetooth or infrared data association (IrDA)) or a second network 1199 (e.g., a wireless wide area network such as a cellular network) through a relevant module among the wireless communication module 1192 or the wired communication module 1194.

The wireless communication module 1192 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the disclosure, "GPS" and "GNSS" may be interchangeably used.

According to an embodiment of the disclosure, when the wireless communication module 1192 supports cellar communication, the wireless communication module 1192 may, for example, identify or authenticate the electronic device 1101 within a communication network using the subscriber identification module (e.g., a SIM card) 1196. According to an embodiment, the wireless communication module 1192 may include a CP separate from the processor 1120 (e.g., an AP). In this case, the communication processor may perform at least a portion of functions associated with at least one of elements 1110, 1120, 1130, 1150, 1160, 1170, 1176, 1177, 1179, 1180, 1188, 1189, 1190, 1192, 1194 and 1196 of the electronic device 1101 in substitute for the processor 1120 when the processor 1120 is in an inactive (sleep) state, and together with the processor 1120 when the processor 1120 is in an active state. According to an embodiment, the wireless communication module 1192 may include a plurality of communication modules, each supporting only a relevant communication scheme among cellular communication, short-range wireless communication, or a GNSS communication scheme.

The wired communication module 1194 may include, for example, include a local area network (LAN) service, a power line communication, or a plain old telephone service (POTS).

For example, the first network 1198 may employ, for example, Wi-Fi direct or Bluetooth for transmitting or receiving instructions or data through wireless direct connection between the electronic device 1101 and the first external electronic device 1102. The second network 1199 may include a telecommunication network (e.g., a computer network such as a LAN or a WAN, the Internet or a telephone network) for transmitting or receiving instructions or data between the electronic device 1101 and the second electronic device 1104.

According to an embodiment of the disclosure, the instructions or the data may be transmitted or received between the electronic device 1101 and the second external electronic device 1104 through the server 1108 connected with the second network. Each of the external first and second external electronic devices 1102 and 1104 may be a device of which the type is different from or the same as that of the electronic device 1101. According to various embodiments, all or a part of operations that the electronic device 1101 will perform may be executed by another or a plurality of electronic devices (e.g., the first and second external electronic devices 1102 and 1104 or the server 1108).

According to an embodiment of the disclosure, in the case that the electronic device 1101 executes any function or service automatically or in response to a request, the electronic device 1101 may not perform the function or the service internally, but may alternatively or additionally transmit requests for at least a part of a function associated with the electronic device 1101 to any other device (e.g., the first and second external electronic devices 1102 or 1104 or the server 1108). The other electronic device (e.g., the first and second external electronic devices 1102 or 1104 or the server 1108) may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an application processor) which performs corresponding operations by executing one or more software programs which are stored in a memory device (e.g., the memory 1130).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments of the disclosure, at least a part of an apparatus (e.g., modules or functions thereof) or a method (e.g., operations) may be, for example, implemented by instructions stored in a computer-readable storage media (e.g., the memory 1130) in the form of a program module. The instruction, when executed by a processor (e.g., a processor 1120), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a display;
  a microphone;
  a speaker;
  a communication circuit;
  a processor; and
  a memory configured to store instructions and a first application program from a plurality of application programs,
  wherein the instructions, when executed by the processor, cause the electronic device to:
  receive a first user input through the microphone, wherein the first user input includes a request for performing a first task using the electronic device,
  in response to the received first user input, transmit first data related to the first user input to an external server through the communication circuit,
  in response to the received first user input, receive a path rule corresponding to an intent of the first user input from the external server through the communication circuit, wherein the path rule includes a plurality of parameters that correspond to a first sequence of states being performed by the first application program to perform the first task, the first user input omitting at least one parameter of the plurality of parameters,
  perform a partial sequence of states including not all but some of the first sequence of states while displaying at least some of states changed by executing the first application program and performing a function within the first application program utilizing at least one of the plurality of parameters required for a specific state of the path rule, wherein the displaying of the at least some of the states changed includes displaying the performed function within the first application program as an execution screen of the first application program,
  in response to determining that the first user input is omitting the at least one parameter for performing the first sequence of states, display a first graphical user interface (GUI) of the first application program for requesting a user to provide the omitted at least one parameter on the display, based on a specific time elapsing from displaying the first GUI, instead of displaying the first GUI, display a second GUI including an icon and a button partially overlapping the icon, the button being deactivated, after receiving a first touch input to the icon, receive a second user input including a value for the omitted at least one parameter via the second GUI, in response to receiving the second user input, activate the button on the second GUI, in response to a second touch input to the activated button, transmit the path rule, data related to the value of the second user input, and parameter information to the external server through the communication circuit, receive a refined path rule corresponding to the second user input from the external server through the communication circuit, and perform the first sequence of states based on the refined path rule, using the first application program.

2. The electronic device of claim 1, wherein the parameter information includes information necessary for performing a specific unit operation in the path rule.

3. The electronic device of claim 1, wherein the refined path rule is received after receiving the second touch input to the activated button.

4. The electronic device of claim 1, wherein the processor is further configured to:

before displaying the second GUI, transmit second data related to a state of the electronic device that is a performance result of the partial sequence of the states to the external server through the communication circuit.

5. The electronic device of claim 1, wherein the processor is further configured to remove the second GUI after receiving the second touch input to the activated button.

6. A method for operating a speech recognition service of an electronic device, the method comprising:

receiving a first user input through a microphone of the electronic device, wherein the first user input includes a request for performing a first task using the electronic device;

in response to the received first user input, transmitting first data related to the first user input to an external server through a communication circuit of the electronic device;

in response to the received first user input, receiving a path rule corresponding to an intent of the first user input from the external server through the communication circuit, wherein the path rule includes a plurality of parameters that correspond to a first sequence of states being performed by a first application program to perform the first task, the first user input omitting at least one parameter of the plurality of parameters;

performing a partial sequence of states including not all but some of the first sequence of states while displaying at least some of states changed by executing the first application program and performing a function within the first application program utilizing at least one of the plurality of parameters required for a specific state of the path rule, wherein the displaying of the at least some of the states changed includes displaying the performed function within the first application program as an execution screen of the first application program;

in response to determining that the first user input is omitting the at least one parameter for performing the first sequence of states, displaying a first graphical user interface (GUI) of the first application program for requesting a user to provide the omitted at least one parameter on the display;

based on a specific time elapsing from displaying the first GUI, instead of displaying the first GUI, displaying a second GUI including an icon and a button partially overlapping the icon, the button being deactivated;

after receiving a first input to the icon, receiving a second user input including a value for the omitted at least one parameter via the second GUI;

in response to receiving the second user input, activating the button on the second GUI;

in response to a second touch input to the activated button, transmitting the path rule, data related to the value of the second user input, and parameter information to the external server through the communication circuit;

receiving a refined path rule corresponding to the second user input from the external server through the communication circuit; and performing the first sequence of states based on the refined path rule, using the first application program.

7. The method of claim 6, wherein the parameter information includes information necessary for performing a specific unit operation in the path rule.

8. The method of claim 6, wherein the refined path rule is received after receiving the second touch input to the activated button.

9. The method of claim 6, further comprising:

before displaying the second GUI, transmitting second data related to a state of the electronic device that is a performance result of the partial sequence of the states to the external server.

10. The method of claim 6, further comprising removing the second GUI after receiving the second touch input to the activated button.

* * * * *